(12) United States Patent
Yamaguchi et al.

(10) Patent No.: US 8,955,977 B2
(45) Date of Patent: Feb. 17, 2015

(54) PROJECTION-TYPE IMAGE DISPLAY APPARATUS

(75) Inventors: Yutaka Yamaguchi, Utsunomiya (JP); Takehito Kawasumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/606,748

(22) Filed: Sep. 7, 2012

(65) Prior Publication Data

US 2013/0063700 A1 Mar. 14, 2013

(30) Foreign Application Priority Data

Sep. 13, 2011 (JP) .................. 2011-199436

(51) Int. Cl.

| | |
|---|---|
| G03B 21/14 | (2006.01) |
| G02B 27/14 | (2006.01) |
| G03B 21/20 | (2006.01) |
| G03B 33/12 | (2006.01) |
| H04N 9/31 | (2006.01) |
| G03B 21/28 | (2006.01) |

(52) U.S. Cl.
CPC .......... *G02B 27/145* (2013.01); *G03B 21/2033* (2013.01); *G03B 33/12* (2013.01); *H04N 9/3105* (2013.01); *H04N 9/3161* (2013.01); *H04N 9/3167* (2013.01); *G03B 21/28* (2013.01)
USPC ................. 353/20; 353/30; 353/31; 353/34; 353/85; 353/99; 349/5; 349/9

(58) Field of Classification Search
USPC .......... 353/20, 30, 31, 33, 34, 38, 84, 85, 98, 353/99; 348/743–747, E5.133, E5.141, 348/E9.027; 349/5, 7–9, 41, 42, 44, 110, 349/111; 359/279, 290, 291, 298

See application file for complete search history.

(56) References Cited

U.S. PATENT DOCUMENTS

| | | | |
|---|---|---|---|
| 6,478,429 B1 * | 11/2002 | Aritake et al. .................. 353/31 |
| 6,942,345 B2 * | 9/2005 | Okuyama et al. ............... 353/20 |
| 7,336,411 B2 * | 2/2008 | Miyagaki et al. ............. 359/279 |
| 2002/0089679 A1 * | 7/2002 | Yi et al. ......................... 358/1.9 |
| 2005/0280778 A1 * | 12/2005 | Kurioka .......................... 353/20 |
| 2006/0238665 A1 * | 10/2006 | Stahl et al. ........................ 349/5 |
| 2007/0236670 A1 * | 10/2007 | Kamijima et al. .............. 353/81 |
| 2009/0141243 A1 * | 6/2009 | Suzuki ............................ 353/20 |
| 2009/0237616 A1 | 9/2009 | Aizaki |

FOREIGN PATENT DOCUMENTS

JP 2009-237565 A 10/2009

* cited by examiner

*Primary Examiner* — Sultan Chowdhury
(74) *Attorney, Agent, or Firm* — Canon USA Inc IP Division

(57) ABSTRACT

A projection-type image display apparatus includes a color separation element including a color separation surface, a light modulation element configured to receive the light divided by the color separation element, a polarizing beam splitter disposed between the color separation element and a projection optical system to separate a light path of a light modulated by the light modulation element according to a polarization direction and guide the resulting light to the projection optical system, and a phase difference plate disposed between the color separation element and the light modulation element. An optic axis of the phase difference plate and the normal of the color separation surface are substantially parallel or perpendicular to each other, in a cross section parallel to a normal of the color separation surface and a normal of the light modulation element.

12 Claims, 22 Drawing Sheets

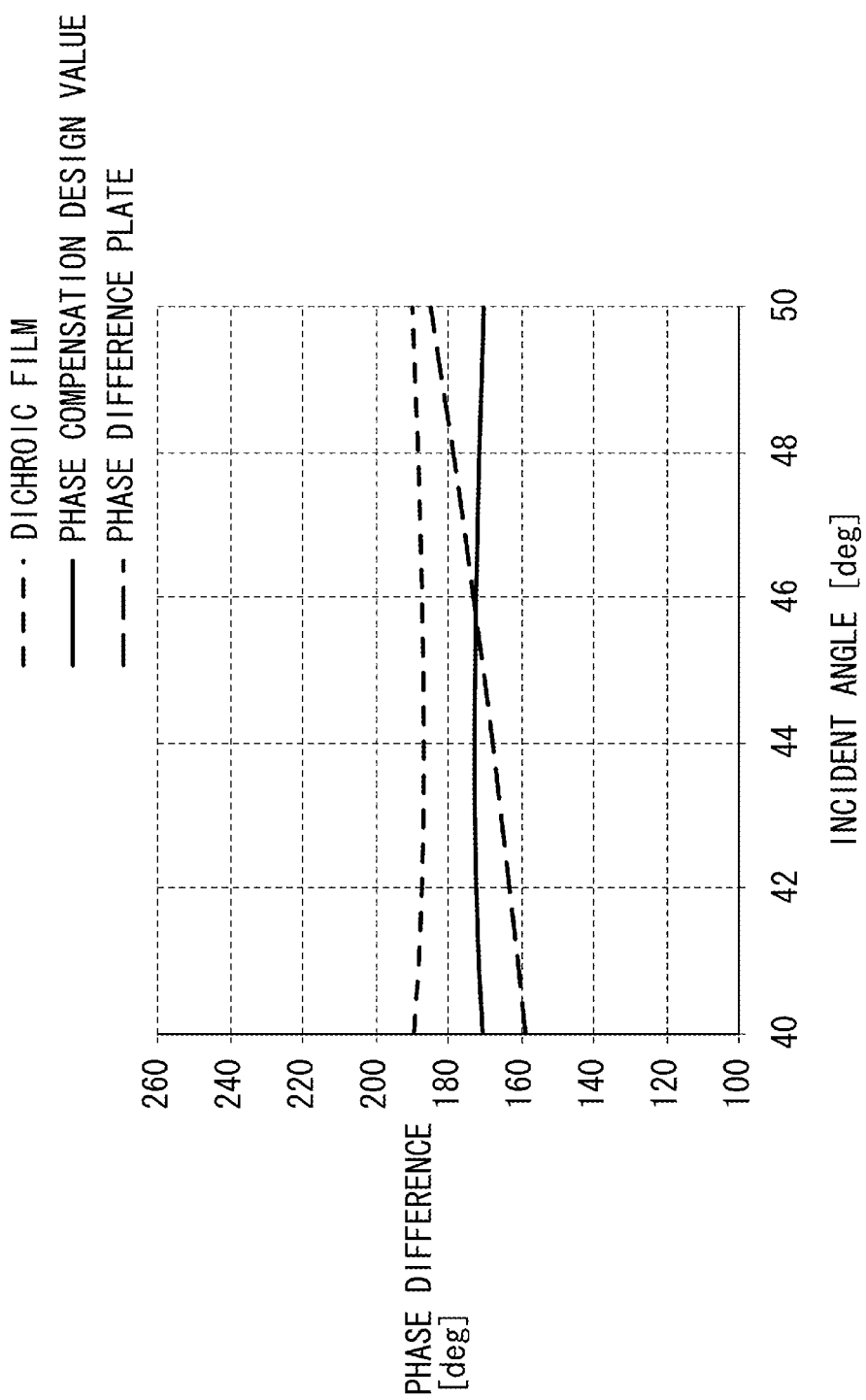

PROJECTION-TYPE IMAGE DISPLAY APPARATUS

BACKGROUND OF THE INVENTION

1. Field of the Invention

The present invention relates to a projection-type image display apparatus that performs color-separation of light from a light source.

2. Description of the Related Art

In the past, projection-type image display apparatuses (liquid crystal projectors) displaying image in various ways have been proposed. US 2009/0237616 discusses a configuration that uses a polarizing ray splitter and a cross dichroic prism to separate light from a light source into lights of a plurality of wavelength bands and irradiate reflection-type image display elements (light modulation elements) corresponding to the lights of the respective wavelength bands with the separated lights. The lights with which the reflection-type image display elements are irradiated are reflected with their polarization states changed according to an image signal and are then projected onto a screen through the cross dichroic prism and the polarizing beam splitter and.

In order to suppress the degradation of a contrast of a projection image by a phase difference caused by a dichroic film of the cross dichroic prism, US 2009/0237616 designs the dichroic film such that the phase difference caused by the dichroic film is 15 degrees or less.

However, the dichroic film of US 2009/0237616 has a problem in that the color separation characteristics of the dichroic film are degraded.

SUMMARY OF THE INVENTION

According to an aspect of the present invention, a projection-type image display apparatus includes a color separation element including a color separation surface configured to separate an incident light into a plurality of lights with wavelength bands different from each other, a light modulation element configured to receive the light divided by the color separation element, a polarizing beam splitter disposed between the color separation element and a projection optical system to separate a light path of a light modulated by the light modulation element according to a polarization direction and guide the resulting light to the projection optical system; and a phase difference plate disposed between the color separation element and the light modulation element, wherein, an optic axis of the phase difference plate and the normal of the color separation surface are substantially parallel or perpendicular to each other, in a cross section parallel to a normal of the color separation surface and a normal of the light modulation element.

According to another aspect of the present invention, an image display apparatus includes a projection optical system that is provided integratedly or is installed detachably.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating incident angle characteristics with respect to the phase difference occurring in a dichroic film, according to an exemplary embodiment of the present invention.

DESCRIPTION OF THE EMBODIMENTS

Various exemplary embodiments, features, and aspects of the invention will be described in detail below with reference to the drawings.

Figure 1:
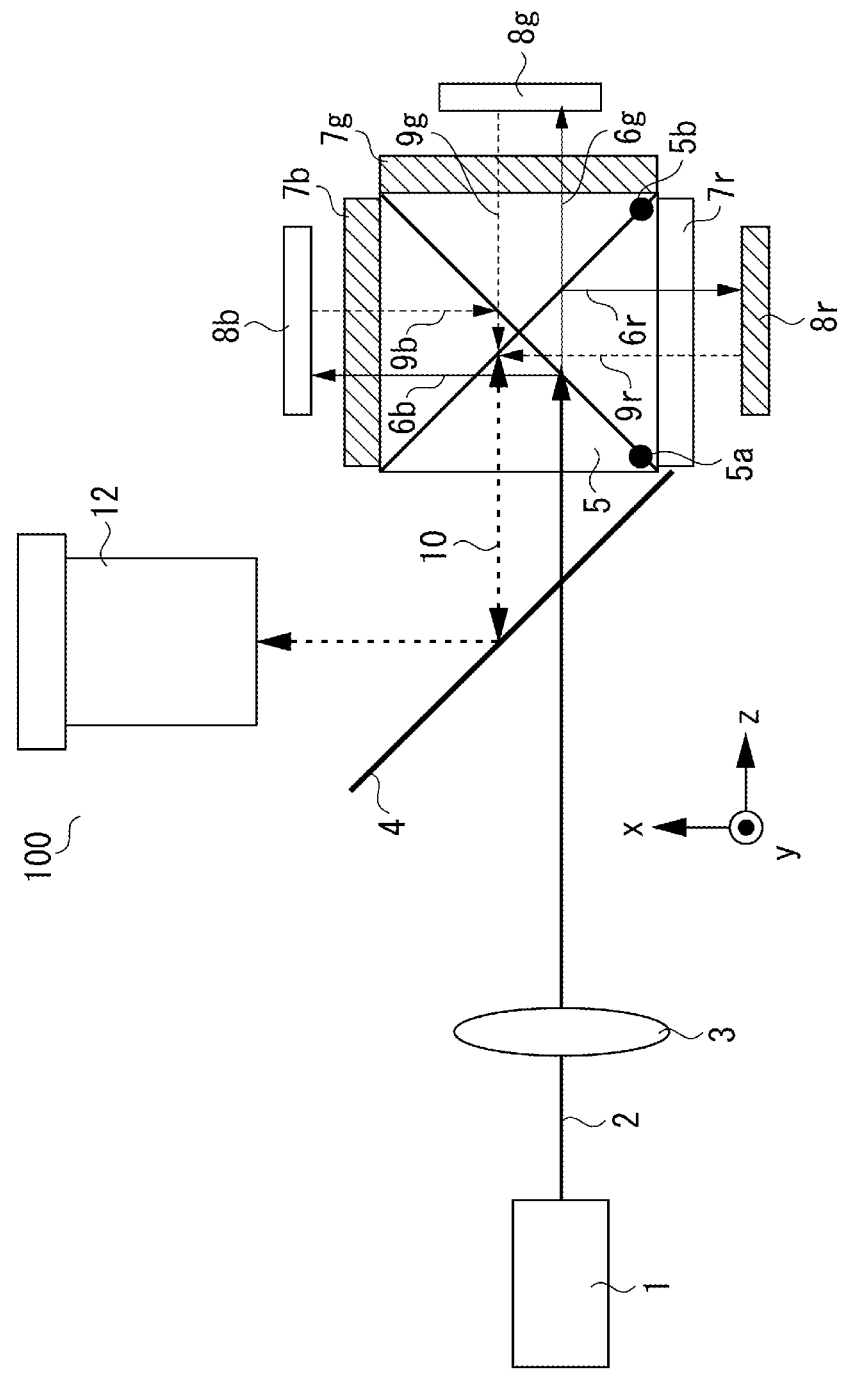
FIG. 1 is a schematic configuration diagram of a projection-type image display apparatus according to a first exemplary embodiment and a second exemplary embodiment of the present invention.

A first exemplary embodiment will be described. FIG. 1 is a schematic configuration diagram of a projection-type image display apparatus 100 according to a first exemplary embodiment of the present invention. An illumination light 2 (represented by a thick solid line) outputted from a light source 1 is incident to a polarizing beam splitter 4 through an illumination optical system 3. The polarizing beam splitter 4 transmits a first polarized light (P-polarized light) and reflects a second polarized light (S-polarized light). The illumination light 2 includes lights of a plurality of wavelength bands. Also, a polarization direction of the light incident to the polarizing beam splitter 4 is nearly aligned by a polarization conversion element (not illustrated) that is disposed nearer to the light source 1 than the polarizing beam splitter 4.

The illumination light 2 transmitted through the polarizing beam splitter 4 is separated by a cross dichroic prism 5 into lights of a plurality of wavelength bands. A dichroic film 5a is configured to reflect a light of a blue wavelength band and transmit a light of a red wavelength band and a light of a green wavelength band. A dichroic film 5b is configured to reflect a light of a red wavelength band and transmit a light of a blue wavelength band and a light of a green wavelength band.

In other words, a light of a blue wavelength band among the illumination light 2 is reflected by the dichroic film 5a, and a light of a red wavelength band among the illumination light 2 is reflected by the dichroic film 5b. A light of a green wavelength band is transmitted through both the dichroic film 5a and the dichroic film 5b. As a result, the illumination light 2 is separated into a light 6r of a red wavelength band, a light 6g of a green wavelength band, and a light 6b of a blue wavelength band, which are represented by thin solid lines in FIG. 1. Then, the lights 6r, 6g and 6b of the respective wavelength bands (hereinafter also referred to as color lights) illuminate image display elements 8r, 8g and 8b (light modulation elements) corresponding to the respective color lights.

The image display elements 8r, 8g and 8b change (modulate) a polarization state of the illumination light 2 according to an image signal and performs reflection. Image lights 9r, 9g and 9b (represented by thin dashed lines) reflected by the image display elements 8r, 8g and 8b are incident to the cross dichroic prism 5 again. The image light 9b of a blue wavelength band is transmitted through the dichroic film 5b and reflected by the dichroic film 5a and then emitted to the polarizing beam splitter 4. The image light 9r of a red wavelength band is transmitted through the dichroic film 5a and reflected by the dichroic film 5b and then emitted to the polarizing beam splitter 4. The image light 9g of a green wavelength band is transmitted through both the dichroic film 5a and the dichroic film 5b and then emitted to the polarizing beam splitter 4.

As above, the image lights 9r, 9g and 9b are combined by the dichroic film 5a and the dichroic film 5b and exit from the cross dichroic prism 5 as a combined image light 10 (represented by a thick dashed line in FIG. 1). The exited combined image light 10 is guided by the polarizing beam splitter 4 to a projection optical system 12 and is then projected onto a screen (projection surface). Also, the polarizing beam splitter 4, the cross dichroic prism 5, and phase difference plates 7r, 7g and 7b are referred to as a color separation/combination optical system.

In general, a light transmitted through or reflected by a dichroic film undergoes a phase difference at the transmission or reflection. Accordingly, the dichroic film changes a polarization state of an incident light. Therefore, among the lights modulated by the image display elements 8r, 8g and 8b, a light (return light), which is to be transmitted through the polarizing beam splitter 4 and returned to a light source side, is guided to the projection optical system 12. Above described light (leaking light) degrades a contrast of a projected image.

Figure 2:
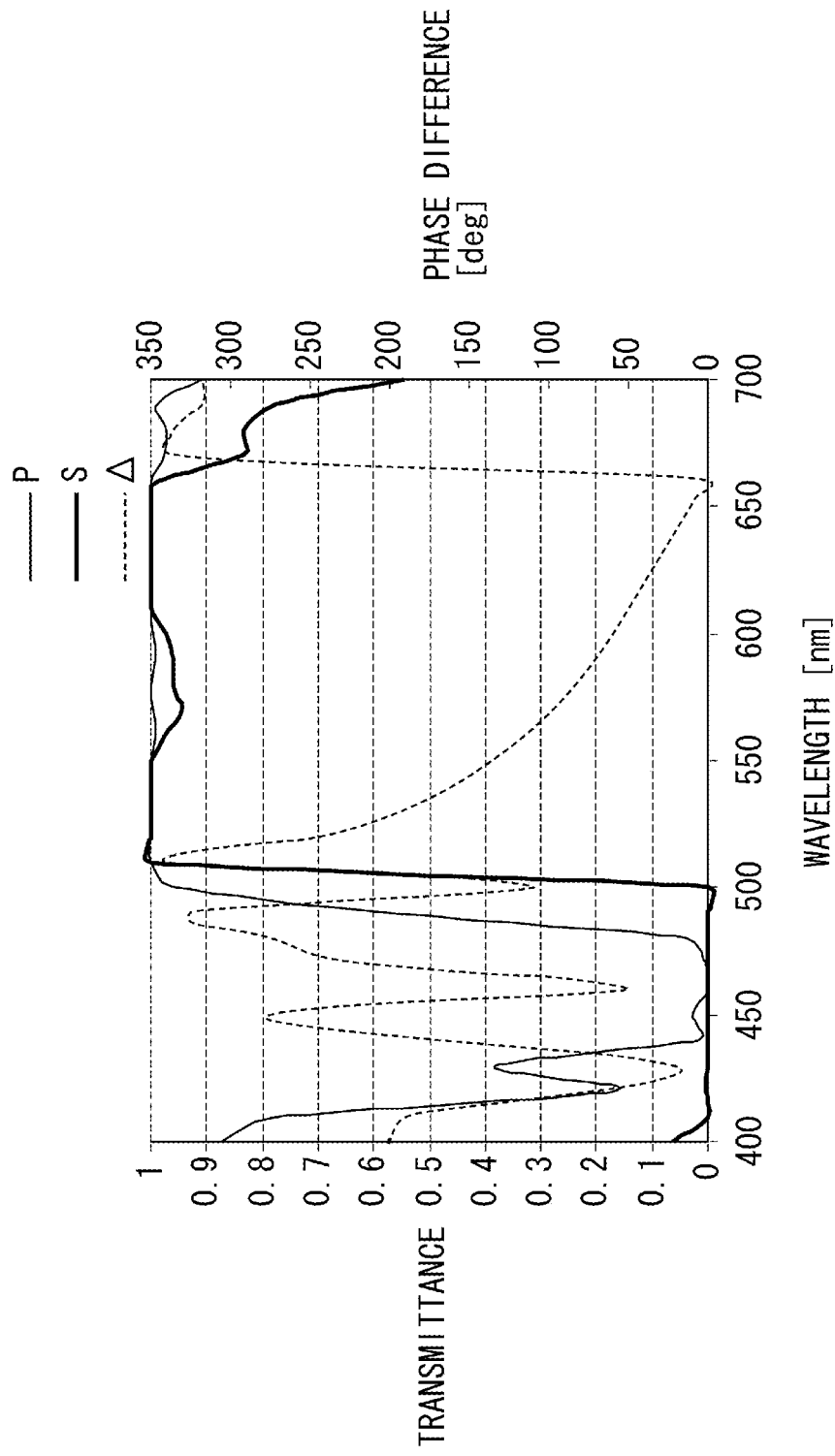
FIG. 2 is a diagram illustrating the transmittance and phase difference characteristics of a dichroic film with respect to each polarization.

How a phase difference is generated depends on the number of layers, the material, or the thickness of the dichroic film. An example of the phase difference of an incident light caused by the dichroic film is illustrated in FIG. 2. FIG. 2 illustrates the spectral transmittance and spectral transmission phase difference characteristics of a dichroic film that reflects a light of a blue wavelength band and transmits lights of red and green wavelength bands. In FIG. 2, a horizontal axis represents a wavelength [nm], and a left vertical axis represents a transmittance when a transmittance of 100% is normalized to 1. In FIG. 2, a thick solid line represents an S-polarization transmittance (left axis), a thin solid line represents a P-polarization transmittance (left axis), and a dashed line represents a transmission phase difference [deg] (right axis).

Also, the phase difference [deg] represented by the right axis of FIG. 2 is a difference between respective phase changes occurring in a P-polarized light and an S-polarized light that are incident on the dichroic film. Referring to FIG. 2, in a transmission band (between long-wavelength side longer than 510 nm and short-wavelength side shorter than 660 nm) of the dichroic film, a phase difference occurring at the dichroic film decreases smoothly as the wavelength increases. However, the influence on an incident polarized light by the phase difference occurring in the dichroic film depends on the azimuth angle of an incident light.

A change in the polarization state when the azimuth angle incident to the dichroic film is varied will be described with reference to FIGS. 3A and 3B. Also, in FIGS. 3A and 3B, an oscillation direction of polarization of an incident light is described as being aligned in an x-direction by a polarizing plate, a polarization conversion element, or the like, before being incident to a dichroic film.

Figure 3A:
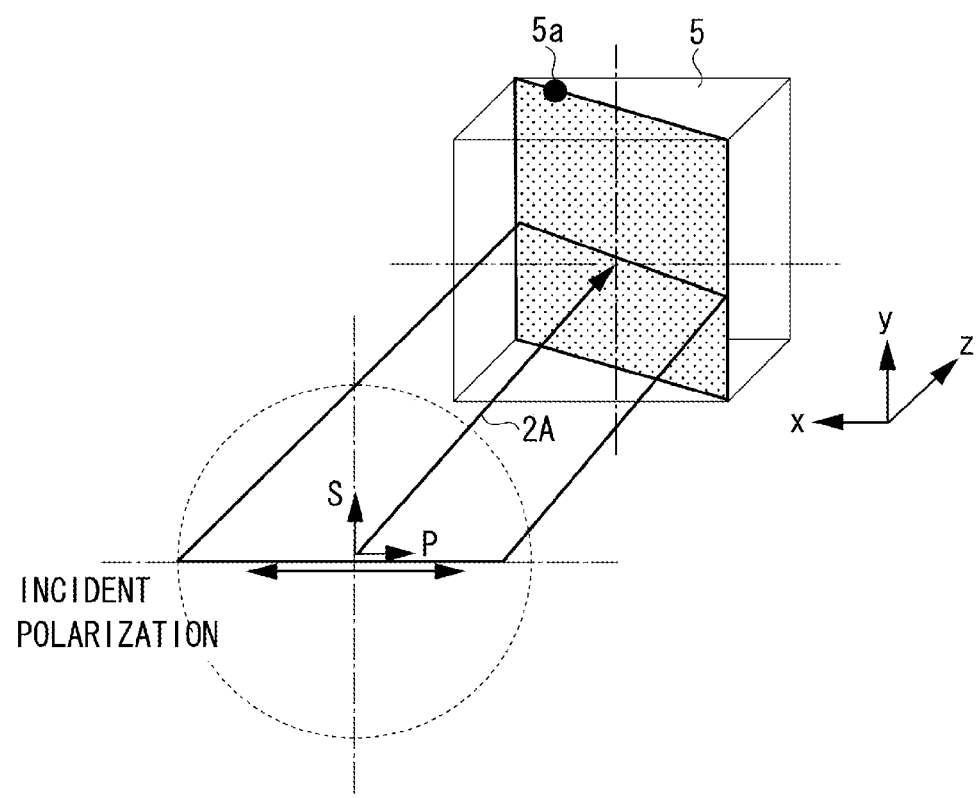
FIGS. 3A, 3B and 3C are diagrams illustrating a polarization change occurring at a dichroic film.

First, as illustrated in FIG. 3A, when an incident light 2A on the dichroic film 5a is parallel to a z axis in FIG. 3A (parallel to an xz plane), a polarization direction of the incident light 2A is a P polarization that oscillates within an incident plane defined with reference to the dichroic film. Accordingly, the incident light 2A is transmitted through the dichroic film 5a while maintaining the polarization state.

Figure 3B:
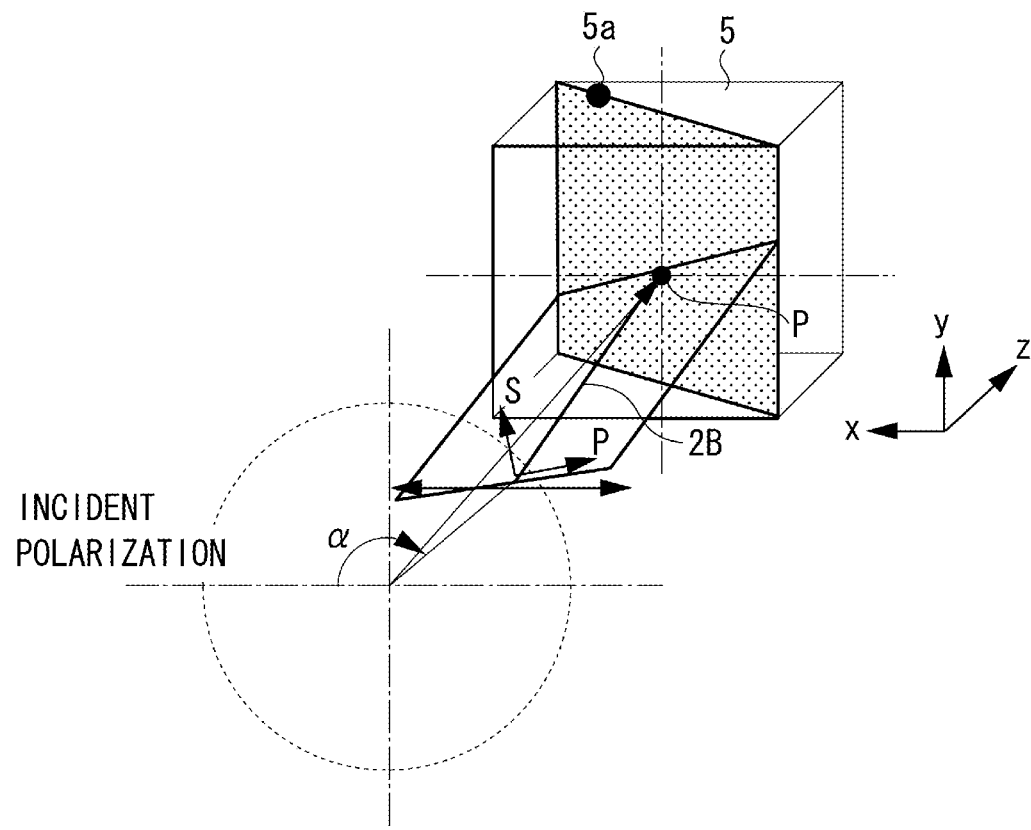

On the other hand, as illustrated in FIG. 3B, when an incident light 2B is incident from the outside of the xz plane, the incident light 2B has components at a P-polarization cross section and an S-polarization cross section with respect to the dichroic film (cross sections perpendicular to the incidence plane). As a result, the incident light 2B is influenced by a phase difference occurring at the dichroic film 5a. Therefore, a polarization state of the incident light 2B is changed when the incident light 2B is transmitted through the dichroic film 5a.

In FIGS. 3A and 3B, it is assumed that an oscillation direction of polarization of an incident light is an x direction. However, even when the oscillation direction of polarization of the incident light is a y direction, a polarization state of an incident light which is incident in deviation from the xz plane is changed when the incident light is transmitted through the dichroic film 5a.

Figure 3C:
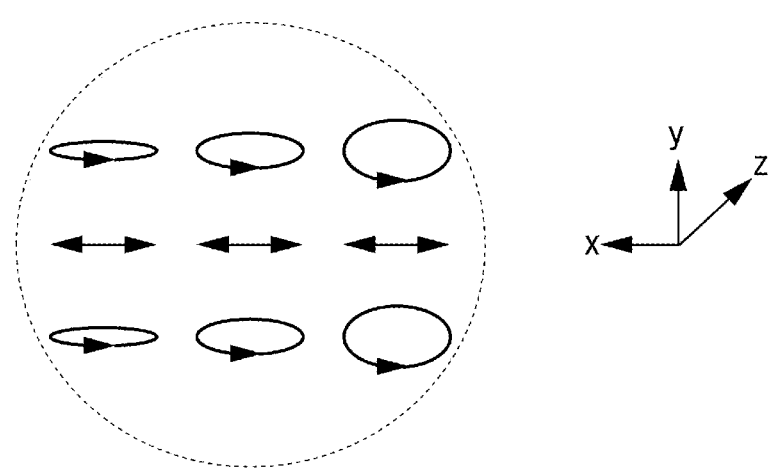

In addition, even when incident lights have the same angle with respect to a z axis, since the angle with respect to the dichroic film 5a is changed by the azimuth angles (angle of α) of the incident lights, the phase differences of the incident lights are not identical. As illustrated in FIG. 3C, a change in the polarization state, which is asymmetrical with respect to a y axis, occurs in a forward path and a return path of a light path. As a result, a leaking light is generated at analysis in the polarizing beam splitter 4, so that the contrast of a projected image is degraded. Also, in FIGS. 3A, 3B, and 3C, although the transmitted light is described as an example, the same is true of a reflected light.

As discussed in US 2009/0237616, a phase difference occurring in the dichroic film can be controlled to be reduced by design, so that a leaking light can be suppressed. However, the implementation of high-definition image display requires a high-performance dichroic film that has a small color separation characteristic change in a desired wavelength band with respect to an incident polarized light, has a high transmittance in a transmission region, and has a high reflectivity in a reflection region. In order to improve color separation characteristics by increasing a ratio of the transmission region and the reflection region, the number of laminated films needs to be increased. However, the number of laminated films is increased, the phase difference tends to be increased. Then, the phase difference is greatly changed by an error or a variation in fabrication. Therefore, a design for satisfying the color separation characteristics and the phase difference characteristics at the same time is very difficult, and degree of difficulty in fabrication is also increased.

The present inventor construed that a portion of repetition-period laminated films constituting a dichroic film is a structural anisotropy based on a microstructure, and thereby interpreted that the dichroic film could be approximated as a phase difference plate whose optic axis was inclined in a surface normal direction of the dichroic film.

Based on this, in the projection-type image display apparatus 100 (FIG. 1) according to the present invention, the phase difference plates 7r, 7g, and 7b are disposed between the cross dichroic prism 5 and the image display elements 8r, 8g, and 8b. In addition, the optic axis c of the phase difference plates 7r, 7b, and 7g is set to be substantially perpendicular or parallel to the surface normal direction of the dichroic layer 5a or 5b. Accordingly, the phase difference generated when light is transmitted through or reflected by the dichroic layer 5a or 5b can be suitably compensated, and the leaking light can be suppressed.

As described above, when the refractive-index anisotropy of the dichroic film is approximated using a uniaxial refractive-index ellipsoidal body, the dichroic film can be regarded as a phase difference plate in which an extraordinary-light refractive index ne, which is an optic axis among an ordinary-light refractive index n0 and the extraordinary-light refractive index ne, is a surface normal direction. Accordingly, the refractive-index anisotropy of the phase difference plate 7g as a compensation plate compensating a phase difference occurring in the dichroic film may be a refractive-index anisotropy that cancels the phase difference occurring in the dichroic film. Specifically, if the magnitude relationship between the ordinary-light refractive index n0 and the extraordinary-light refractive index ne (optic axis) of the phase difference plate 7g is identical to the magnitude relationship between the ordinary-light refractive index n0 and the extraordinary-light refractive index ne when the dichroic film is approximated, setting is performed as follows.

The direction of the extraordinary-light refractive index ne (optic axis) of the dichroic film and the direction of the extraordinary-light refractive index ne (optic axis) of the phase difference plate 7g are set to be substantially perpendicular to each other. Also, if the magnitude relationship between the ordinary-light refractive index n0 and the extraordinary-light refractive index ne (optic axis) of the phase difference plate 7g is different from the magnitude relationship between the ordinary-light refractive index n0 and the extraordinary-light refractive index ne when the dichroic film is approximated, setting is performed as follows. The direction of the extraordinary-light refractive index ne (optic axis) of the dichroic film and the direction of the extraordinary-light refractive index ne (optic axis) of the phase difference plate 7g are set to be substantially parallel to each other. Accordingly, the phase difference occurring in the dichroic film 5a is cancelled out by the phase difference plate 7g. In this specification, when the refractive-index anisotropy is different the above-described relationship is satisfied.

Specifically, the phase generated in the dichroic film can be compensated by setting the optic axis of the phase difference plate 7g to be substantially perpendicular or parallel to the angle formed with the optic axis of the dichroic film, in other words, the surface normal of the dichroic film. An individual skilled in the art will appreciate that if the optical path between the phase difference plate and the dichroic film is folded by a mirror then relative orientation of the optic axes of will be adjusted to compensate for the fold in the optical path. That substantially parallel and substantially perpendicular in the context of the present invention refers to the unfolded optical path.

Although the above description has been made using the phase difference plate 7g among the phase difference plates 7r, 7g, and 7b, the same is true of the phase difference plates 7r and 7b.

The direction of the optic axis can be analyzed by an ellipsometer, a polarimeter, or the like.

A description will be made with reference to FIGS. 4A and 4B in detail. Also, in FIGS. 4A and 4B, for the purpose of simplicity, a light path of a green wavelength band is extracted and represented. However, the same is true of light passes of other wavelength bands.

A direction c of the optic axis of the phase difference plate 7g is within a cross section parallel to a surface normal m of the dichroic film 5a and an exit-surface normal n (or incidence-surface normal n) of the cross dichroic prism 5. It may also be said that the direction c of the optic axis of the phase difference plate 7g is within a cross section parallel to a normal of the image display element and a surface normal m of the dichroic film 5a. Then, the direction c of the optic axis of the phase difference plate 7g is set to be perpendicular (FIG. 4A) or parallel (FIG. 4B) to the surface normal m of the dichroic film 5a.

Figure 4A:
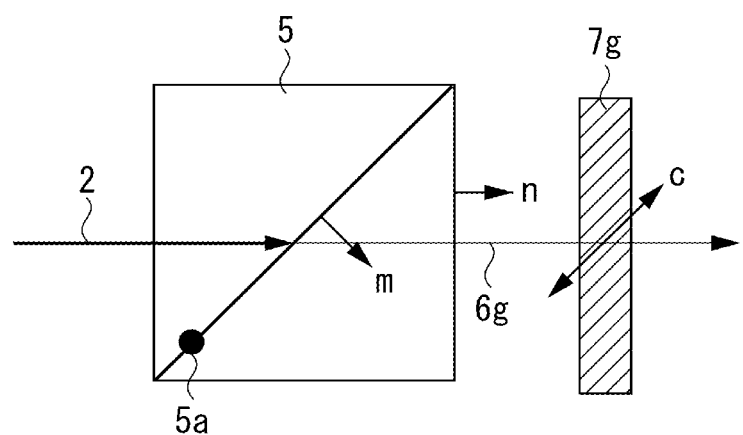
FIGS. 4A and 4B are illustration diagram of a phase difference plate according to an exemplary embodiment of the present invention.
Figure 4B:
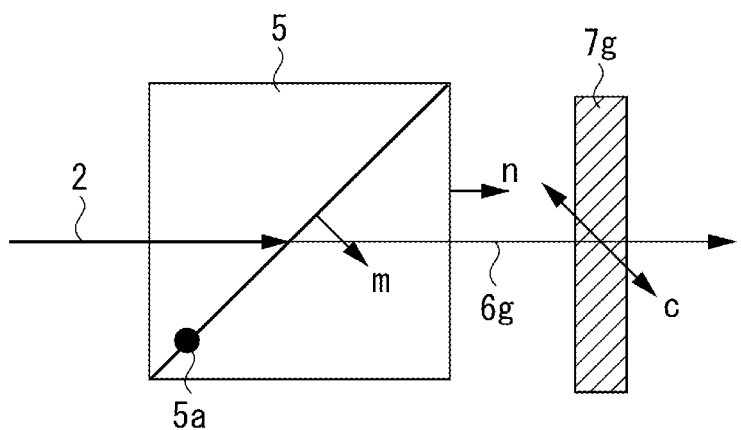

In FIG. 4A, the direction c of the optic axis of the phase difference plate 7g is set to be perpendicular to the surface normal m of the dichroic film 5a. In FIG. 4B, the direction c of the optic axis of the phase difference plate 7g is set to be parallel to the surface normal m of the dichroic film 5a. By setting the optic axis of the phase difference plate 7g suitably as illustrated in FIGS. 4A and 4B, the phase difference asymmetrical with respect to the incidence direction occurring in the dichroic film 5a can be compensated. Accordingly, the change of a polarization state can be suppressed.

FIG. 5 illustrates the relationship between a phase difference Δ [deg] and an incident angle [deg] that occurs in the dichroic film having the characteristics illustrated in FIG. 2. A wavelength used is 532 nm. A horizontal axis represents an incident angle of light with respect to the dichroic film normal. A vertical axis represents a phase difference Δ [deg]. A thick dashed line represents a phase difference occurring in the dichroic film. A solid line represents the phase difference characteristics of compensation optimal as the phase difference plate, with respect to the phase difference caused by the dichroic film represented by the thick dashed line. A long dashed line represents the phase difference characteristics (compensation characteristics) when a phase difference plate formed of crystal is used in the configuration of FIG. 4A. Ideally, the phase difference between a P polarization and an S polarization may always be 360 degrees regardless of an incident angle. However, actually, a phase difference between the P polarization and the S polarization is generated as represented by a thick dashed line in FIG. 5. Therefore, a solid line represents the ideal characteristics for compensating the phase difference. Also, a thin dashed line represents the characteristics when one phase difference plate according to the present invention is disposed therein.

Figure 6:
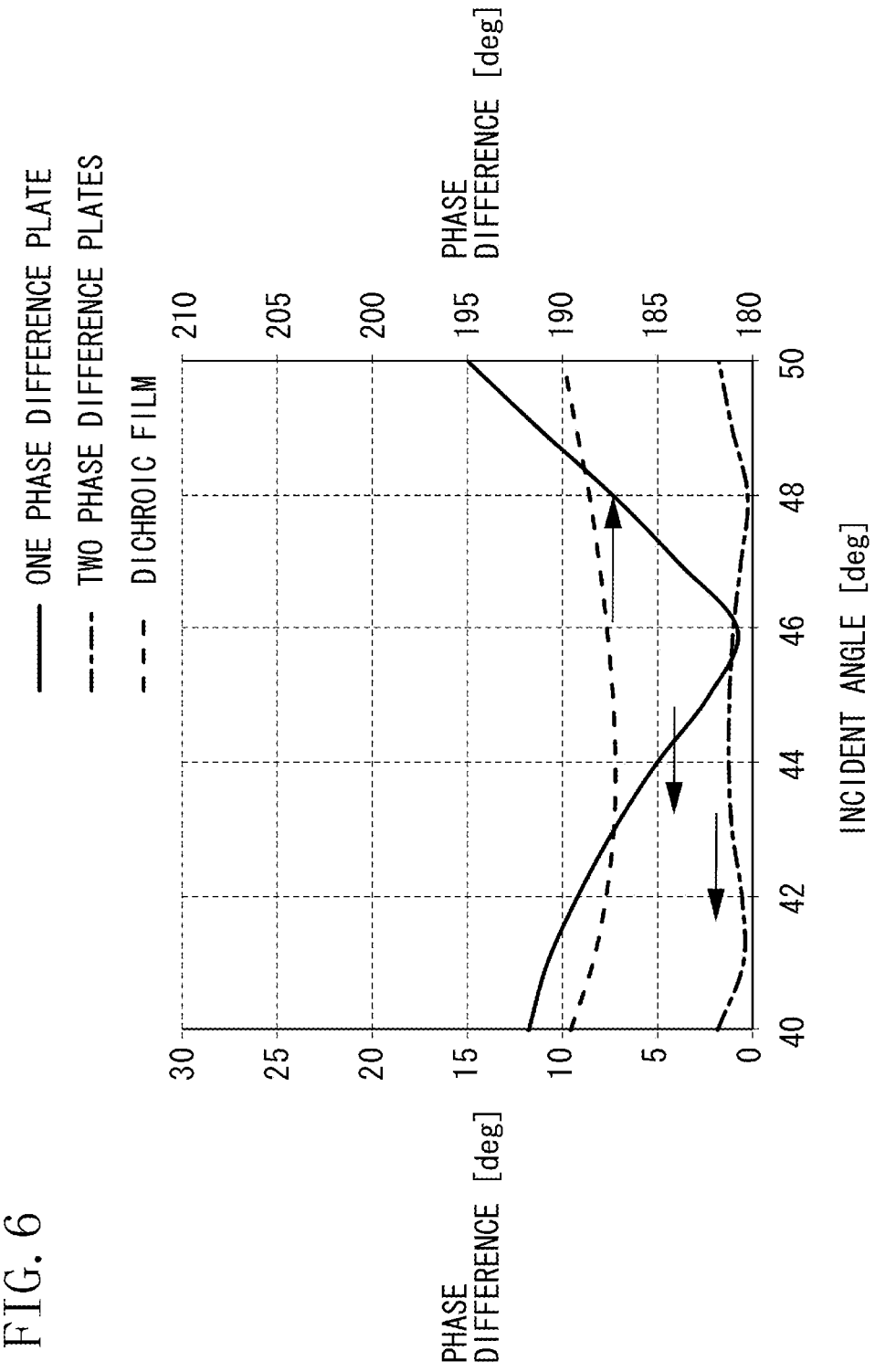
FIG. 6 is a diagram illustrating incident angle characteristics with respect to the phase difference compensation according to a first exemplary embodiment of the present invention.

A difference between the optimum compensation characteristics represented by a solid line in FIG. 5 and the phase difference characteristics represented by a long dashed line in FIG. 5 is represented by a solid line in FIG. 6. Arrows in FIG. 6 indicate vertical axes to be referred. In FIG. 6, a horizontal axis represents an incident angle [deg] of a ray, and a vertical axis represents a phase difference [deg]. A dashed line in FIG. 6 represents a phase difference occurring in dichroic film when the phase difference plate is not used (before compensation is performed by the phase difference plate). A right axis of FIG. 6 corresponds to the above phase difference [deg]. It can be seen from FIG. 6 that the phase difference occurring in the dichroic film is cancelled by using the difference plate 7g with the direction c of the optic axis inclining according to the present invention. The same effect can be achieved in the configuration of FIG. 4B.

Also, a dashed-dotted line of FIG. 6 represents a difference between the phase difference characteristics of the phase difference plate and the ideal compensation characteristics when two phase difference plates having characteristics different from each other are used. By using two phase difference plates, a phase difference at an incident angle other than 45 degrees is reduced. This will be described in a second exemplary embodiment.

As described above, by providing a phase difference plate, which has a suitably set direction c of an optic axis, between the image display element and the cross dichroic prism, the phase difference caused by the dichroic film can be compensated. Accordingly, a change in the polarization state of an incident light can be suppressed to be small, and a leaking light can be suppressed, so that the contrast of a projected image can be improved.

Also, as another effect of the present invention, since a structure of the dichroic film needs not to be complicated, the degree of difficulty of the design and fabrication of the dichroic film can be reduced.

A configuration of a projection-type image forming apparatus according to a second exemplary embodiment will be described. A schematic configuration of an optical system is the same as in FIG. 1. In a light source 1, three solid light emission sources having respective center wavelengths of 640 [nm], 532 [nm], and 460[nm] are used. The full width at half maximum of each wavelength distribution of a red light with a center wavelength of 640 [nm], a green light with a center wavelength of 532 [nm], and a blue light with a center wavelength of 460 [nm] may advantageously be 30 nm or less.

Also, when the light emitted from the light source 1 is an unpolarized light, it needs to be aligned in a linear polarized light by using a polarization conversion element. However, when the light emitted from the light source 1 is polarized, the polarization conversion element is not necessary.

Also, a polarizing beam splitter 4 is a wire grid polarizer including a fine metal lattice. A wire grid is an element that includes a periodic concavo-convex structure on a light incident surface, the pitch of which is smaller than a visible light wavelength.

Also, the optical system such as the cross dichroic prism, and the image display element may be disposed on either one of the transmission side and the reflection side of the polarizing beam splitter 4. In the first exemplary embodiment and the second exemplary embodiment, in order to suppress any astigmatism generated when a light from the optical system 3 passes through the polarizing beam splitter 4, the cross dichroic prism and the image display element are disposed on the transmission side of the polarizing beam splitter 4. Accordingly, a reflected light reflected by the polarizing beam splitter 4 is guided to a projection optical system 12, so that the astigmatism is suppressed.

Figure 7A:
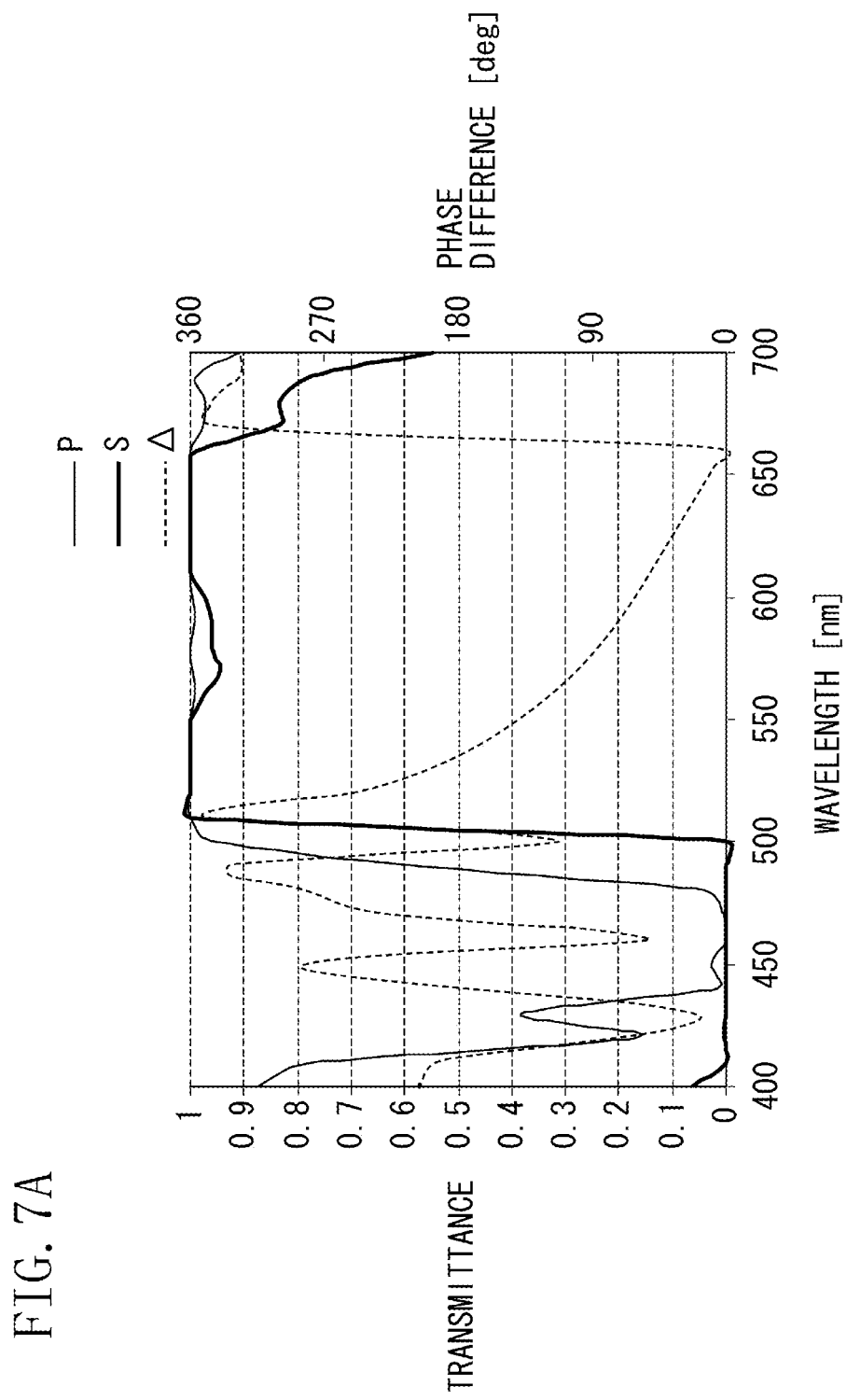
FIGS. 7A and 7B are diagrams illustrating the transmittance and phase difference characteristics of a dichroic film with respect to each polarization according to a first exemplary embodiment of the present invention.
Figure 7B:
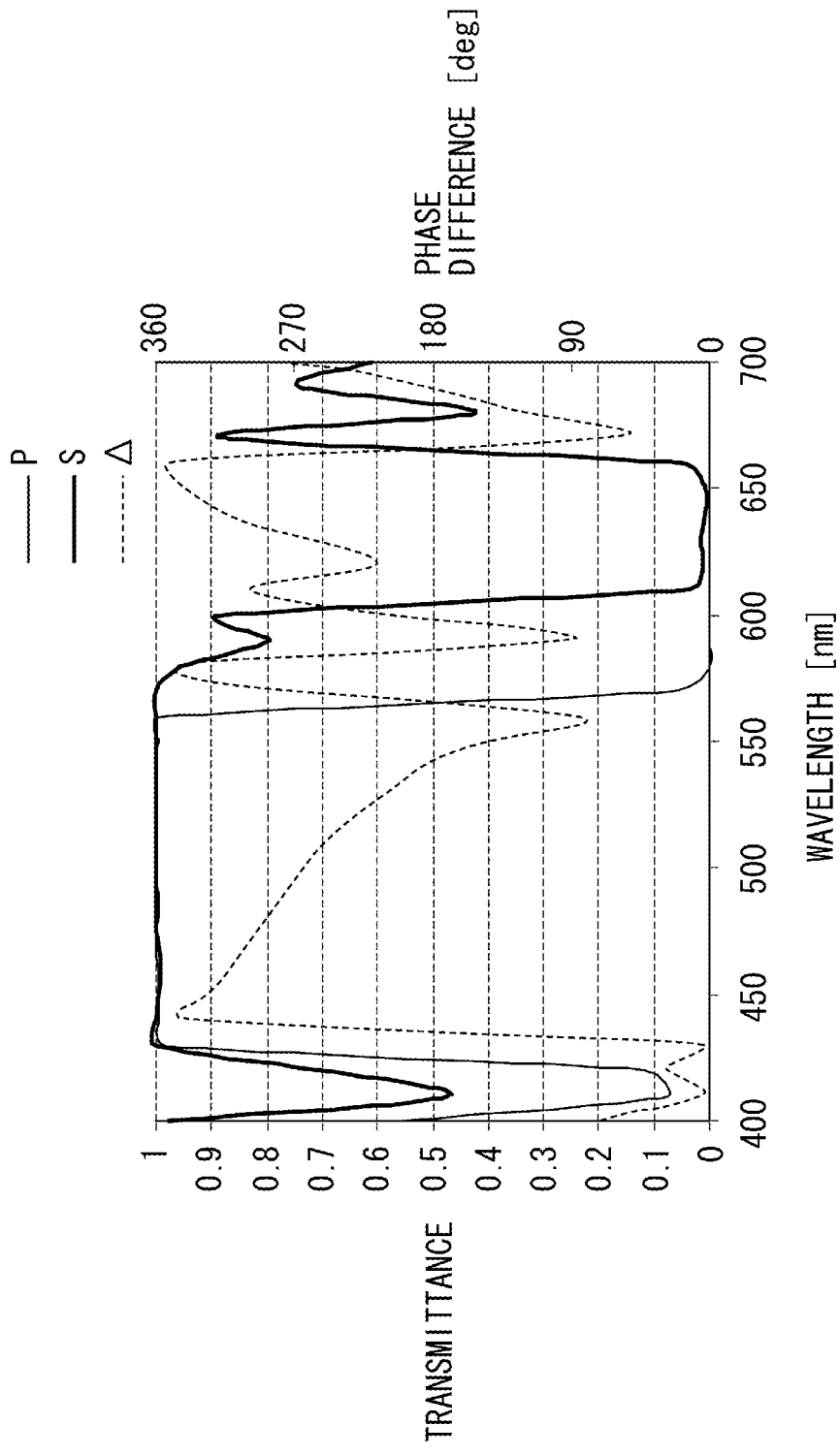

In Tables 1 and 2, a film configuration of the dichroic films 5a and 5b is illustrated. Also, in FIGS. 7A and 7B, the spectral transmittance and the spectral transmittance phase difference of the dichroic films 5a and 5b are illustrated. A thick solid line represents an S-polarization transmittance (left axis), a thin solid line represents a P-polarization transmittance (left axis), and a dashed line represents a transmission phase difference Δ [deg] (right axis).

The dichroic film 5a has a property of reflecting a light with a center wavelength of 460 [nm] and transmitting a light with a center wavelength of 532 [nm] and a light with a center wavelength of 640 [nm]. The dichroic film 5b has a property of transmitting a light with a center wavelength of 460 [nm] and a light with a center wavelength of 532 [nm] and reflecting a light with a center wavelength of 640 [nm].

In Table 3, configurations of the phase difference plates 7r, 7g and 7b according to the second exemplary embodiment are illustrated. An axis angle [deg] in Table 3 represents an angle of the optic axis of the phase difference plate. The optic axis of the phase difference plate 7b for blue and the phase difference plate 7g for green is an inclination angle with respect to a surface normal of the dichroic film 5a. The axis angle of the optic axis of the phase difference plate 7r is an inclination angle with respect to a surface normal of the dichroic film 5b.

Figure 8A:
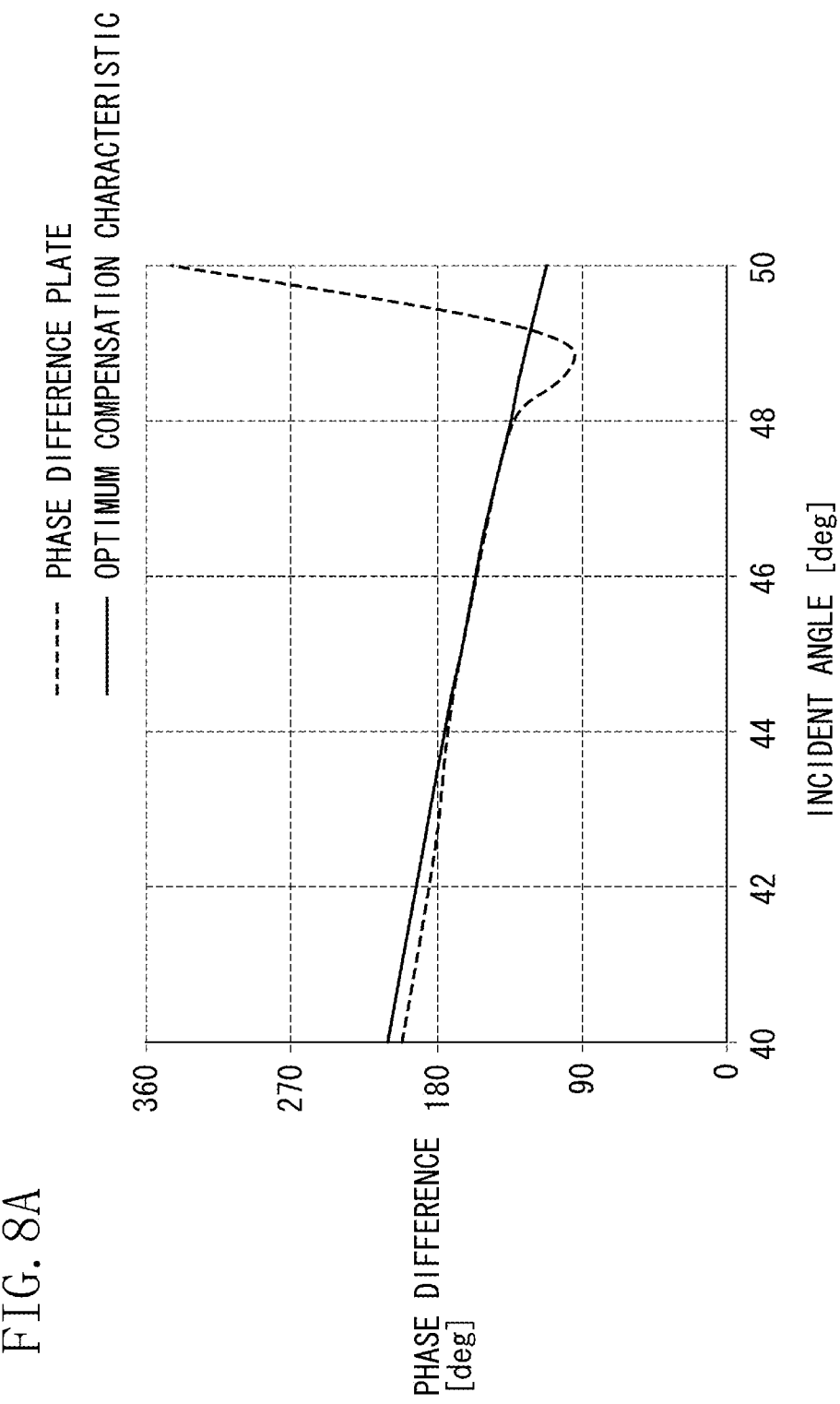
FIGS. 8A, 8B and 8C are diagrams illustrating incident angle characteristics with respect to the phase difference of each phase difference plate according to a second exemplary embodiment of the present invention.
Figure 8B:
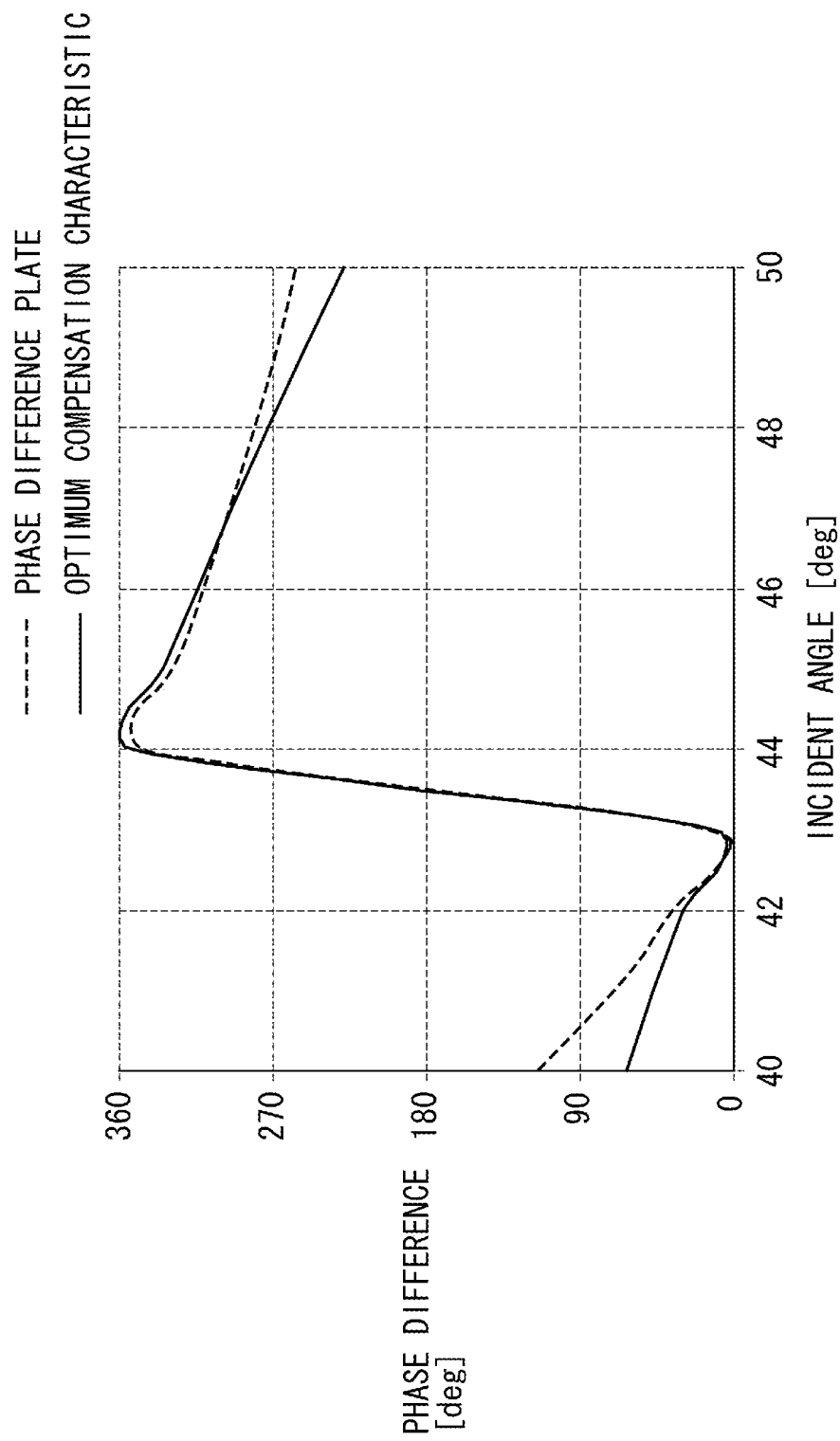
Figure 8C:
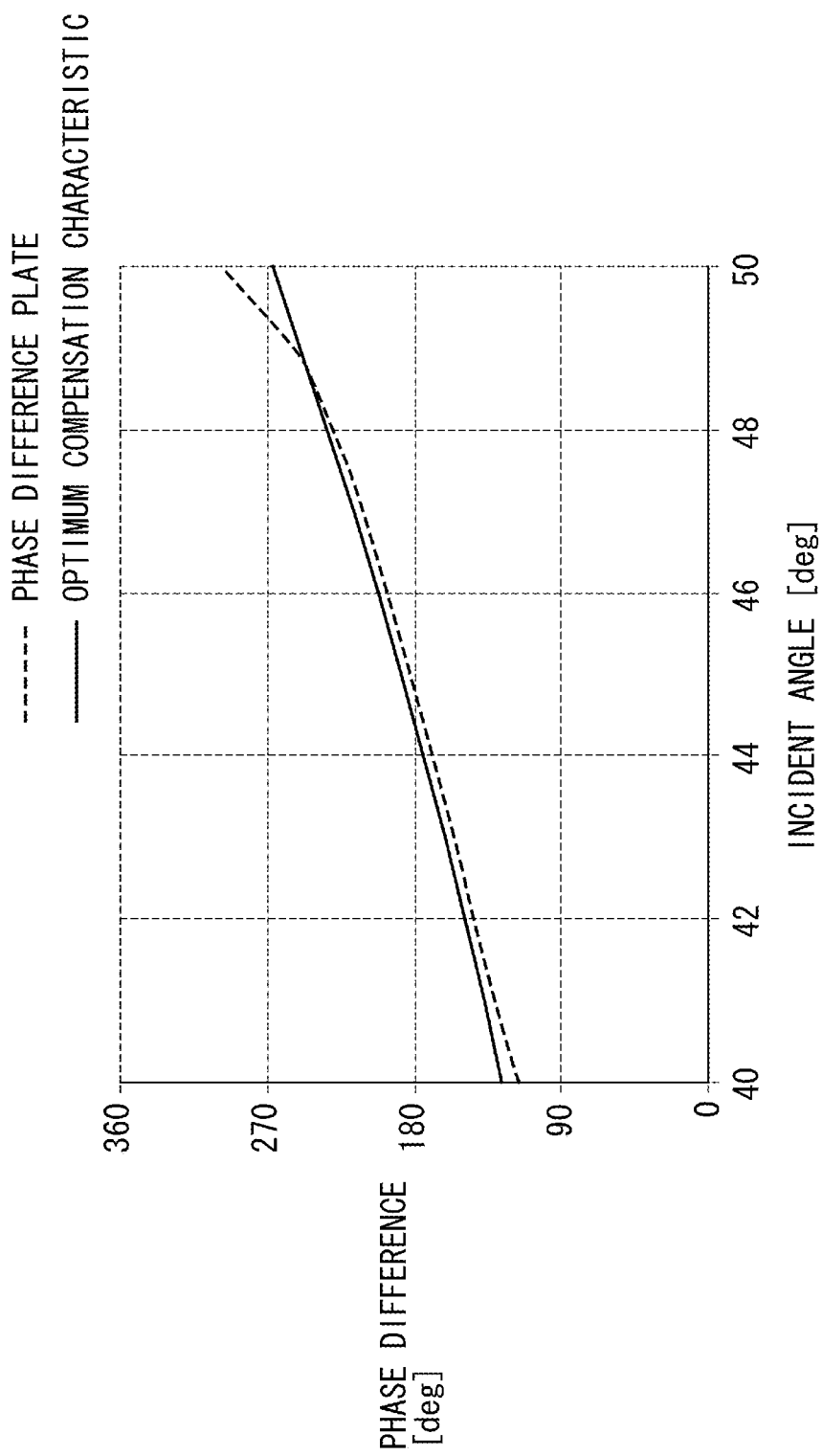

FIGS. 8A, 8B and 8C illustrate the incident angle characteristics of the phase difference plate with respect to a phase difference according to a second exemplary embodiment. FIGS. 8A, 8B and 8C correspond to the phase difference plates 7r, 7g and 7b respectively, and a solid line represents the optimum phase difference characteristics with respect to the dichroic films 5a and 5b.

Figure 9:
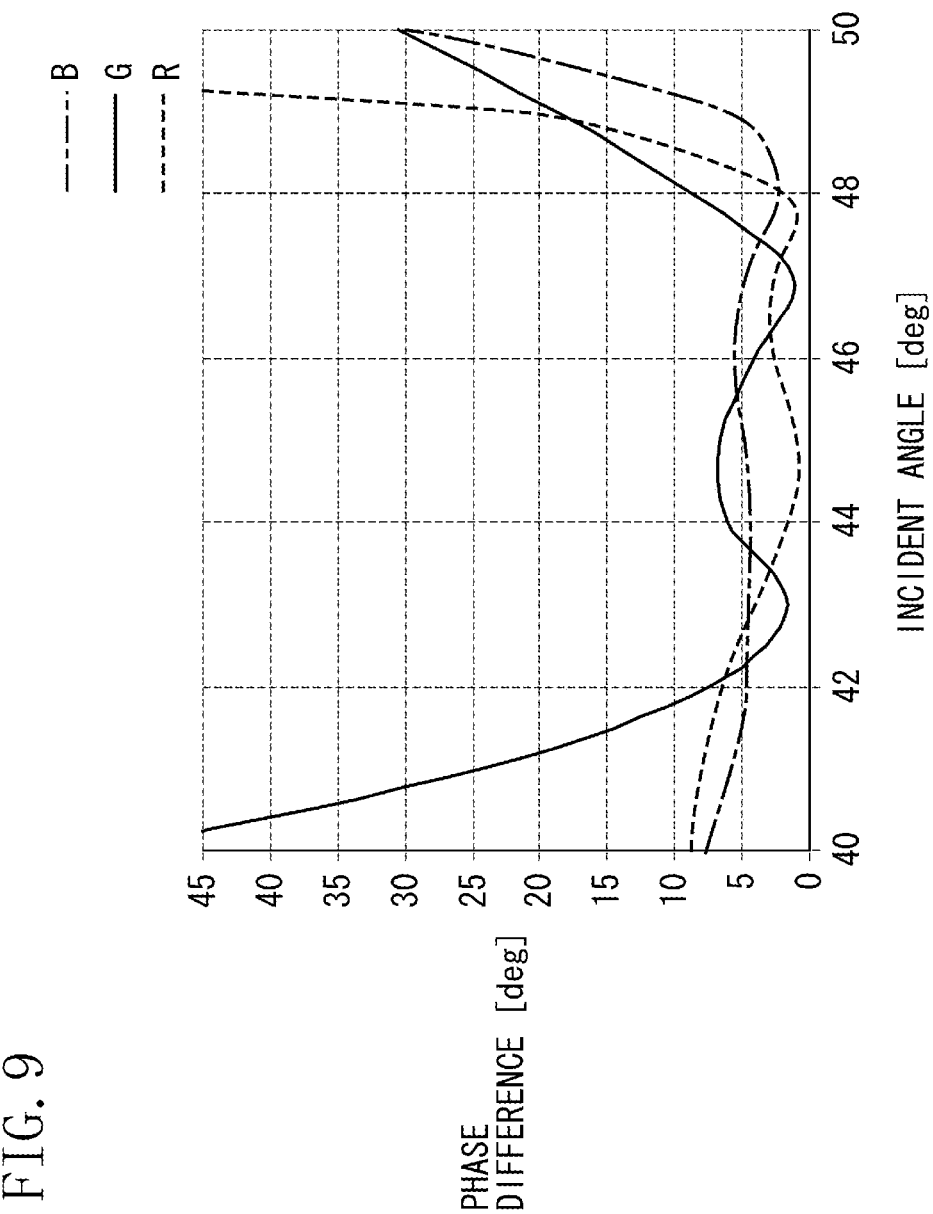
FIG. 9 is a diagram illustrating incident angle characteristics with respect to the phase difference for each color light after phase compensation according to a second exemplary embodiment of the present invention.

A difference between two phase difference curves represented by solid lines and dashed lines in FIGS. 8A, 8B and 8C are illustrated in FIG. 9. In FIG. 9, a solid line represents a phase difference of a green light (a light of a green wavelength band), a dashed line represents a phase difference of a red light (a light of a red wavelength band), and a dashed-dotted line represents a phase difference of a blue light (a light of a blue wavelength band). By setting the optic axis of the phase difference plate according to the present invention, the phase difference of when the incident angle to the dichroic film is near to 45 degrees is suppressed to be small. As a result, the phase difference occurring in the dichroic film can be suppressed, and the leaking light can be reduced to ¼ or less as compared to the case where the phase difference plate is not provided therein. When an incident light flux F number (Fno) is set to 4.0, the contrast increases from 40:1 to 200:1 owing to an effect of the phase difference plate as compared to the case where the phase difference plate is not provided therein.

A projection-type image display apparatus according to a third exemplary embodiment will be described with reference to FIG. 10. The difference from the first exemplary embodiment is that second phase difference plates 13r, 13g and 13b are disposed between first phase difference plates 7r, 7b and 7g and a cross dichroic prism 5.

Figure 10:
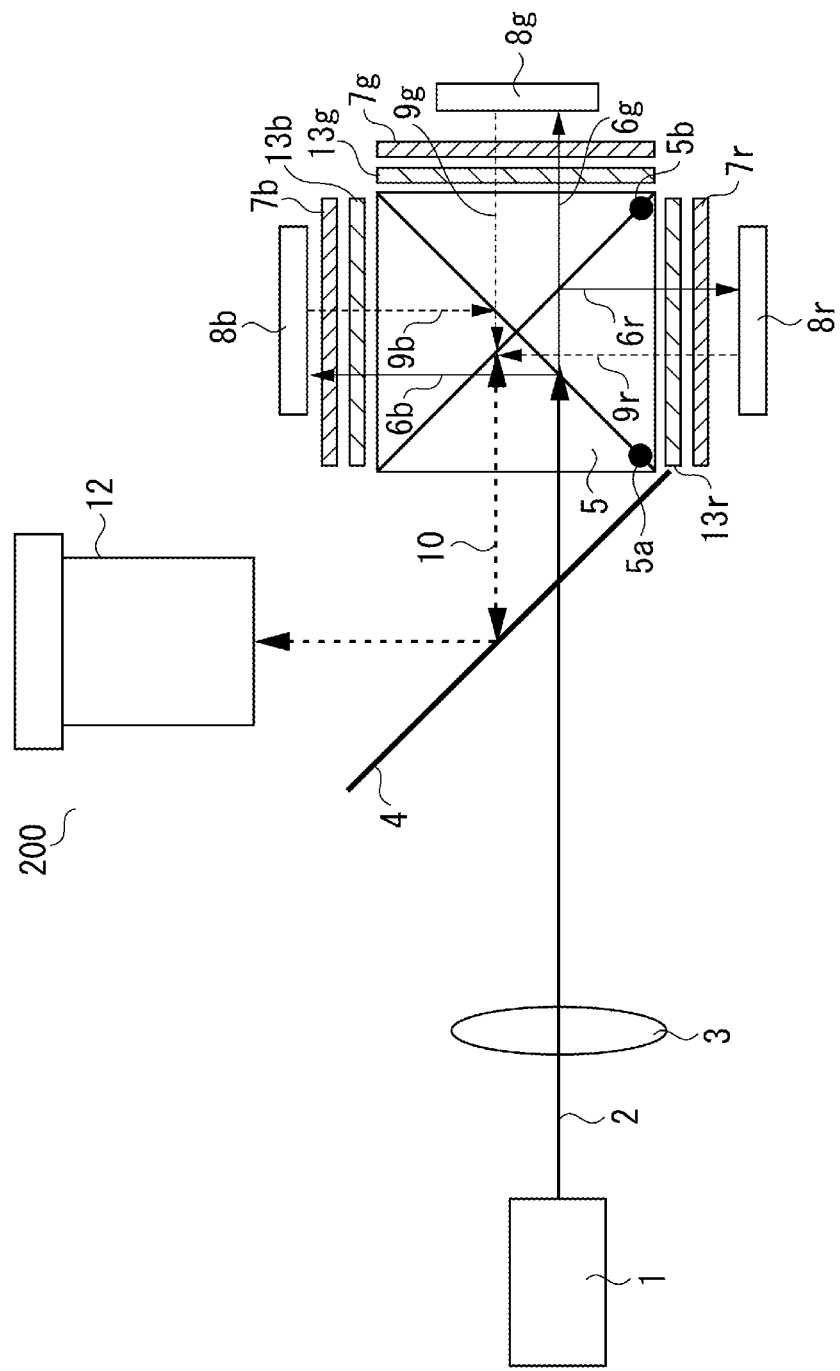
FIG. 10 is a schematic configuration diagram of a projection-type image display apparatus according to a third exemplary embodiment of the present invention.
Figure 11:
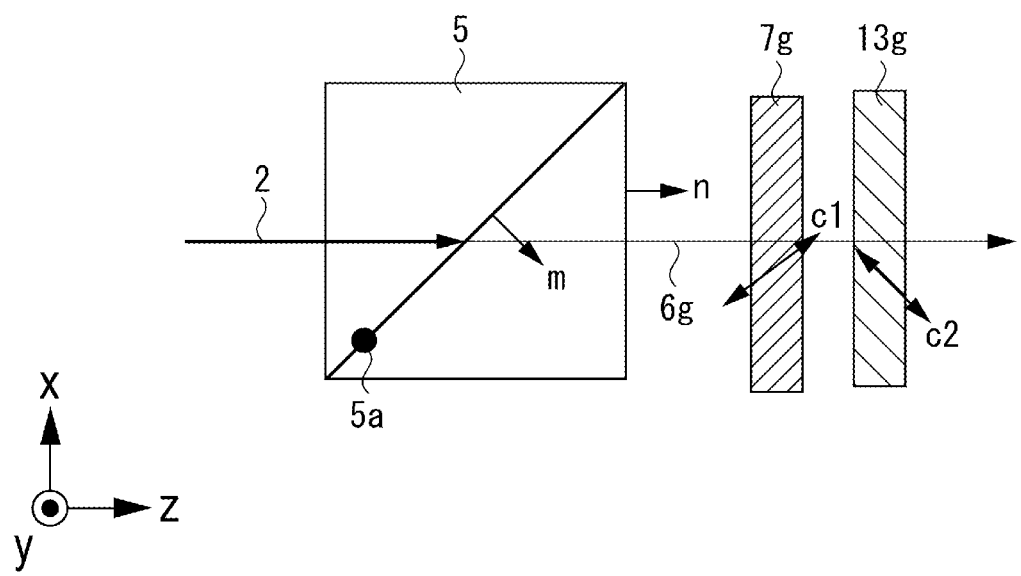
FIG. 11 is an illustration diagram of a phase difference plate according to a third exemplary embodiment of the present invention.

FIG. 11 illustrates a portion of a configuration of a projection-type image display apparatus of FIG. 10 that are provided with a first phase difference plate 7g and a second phase difference plate 13g. For an easy understanding, only one of two dichroic films of a cross dichroic prism is illustrated. In the xz cross section of FIG. 11, a direction c1 of the optic axis of the first phase difference plate 7g and a direction c2 of the optic axis of the second phase difference plate 13g are perpendicular to each other.

In this manner, by combining two phase difference plates with different optic axis directions, a higher compensation effect can be achieved as represented by the dashed-dotted line of FIG. 6. As the number of phase difference plates increases, compensation that is more accurate is possible.

In the third exemplary embodiment, the relationship between the optic axis of the first phase difference plate 7g and the optic axis of the second phase difference plate 13g is identical to the relationship between the optic axis approximating the dichroic film and the optic axis of the first phase difference plate 7g. If the magnitude relationship between the ordinary-light refractive index n0 and the extraordinary-light refractive index ne (optic axis) of the first phase difference plate 7g is identical to the magnitude relationship between the ordinary-light refractive index n0 and the extraordinary-light refractive index ne of the second phase difference plate 13g, setting may be performed as follows. The direction of the extraordinary-light refractive index ne of the first phase difference plate 7g and the direction of the extraordinary-light refractive index ne of the second phase difference plate 13g are set to be perpendicular to each other. If the magnitude relationship between the ordinary-light refractive index n0 and the extraordinary-light refractive index ne of the first phase difference plate 7g is different from the magnitude relationship between the ordinary-light refractive index n0 and the extraordinary-light refractive index ne of the second phase difference plate 13g, setting may be performed as follows. The direction of the extraordinary-light refractive index ne of the first phase difference plate 7g and the direction of the extraordinary-light refractive index ne of the second phase difference plate 13g are set to be parallel to each other. Accordingly, the phase difference occurring in the first phase difference plate 7g can be cancelled by the second phase difference plate 13g, so that a more accurate phase compensation effect can be achieved.

Also, the direction c2 of the optic axis of the second phase difference plate 13g and the direction c1 of the optic axis of the first phase difference plate 7g is not necessarily set to be perpendicular to each other, but may be set to be different from each other. The reason for this is that, according to the refractive-index anisotropy of each phase difference plate, even when the directions c2 and c1 are not accurately perpendicular to each other, the phase difference compensation effect can be achieved as compared to the case where only one phase difference plate is provided therein.

In the above description, the phase difference plate 7g and the phase difference plate 13g disposed on the light path of a green wavelength band are described as an example. However, the same is true for the phase difference plate 7r and the phase difference plate 13r disposed on the light path of a red wavelength band, and the phase difference plate 7b and the phase difference plate 13b disposed on the light path of a blue wavelength band.

In Tables 4A, 4B and 4C, the configurations of the phase difference plates 7r, 13r, 7g, 13g, 7b, and 13b according to the third exemplary embodiment are illustrated. The definition of an axis angle is the same as in Table 3.

Figure 12A:
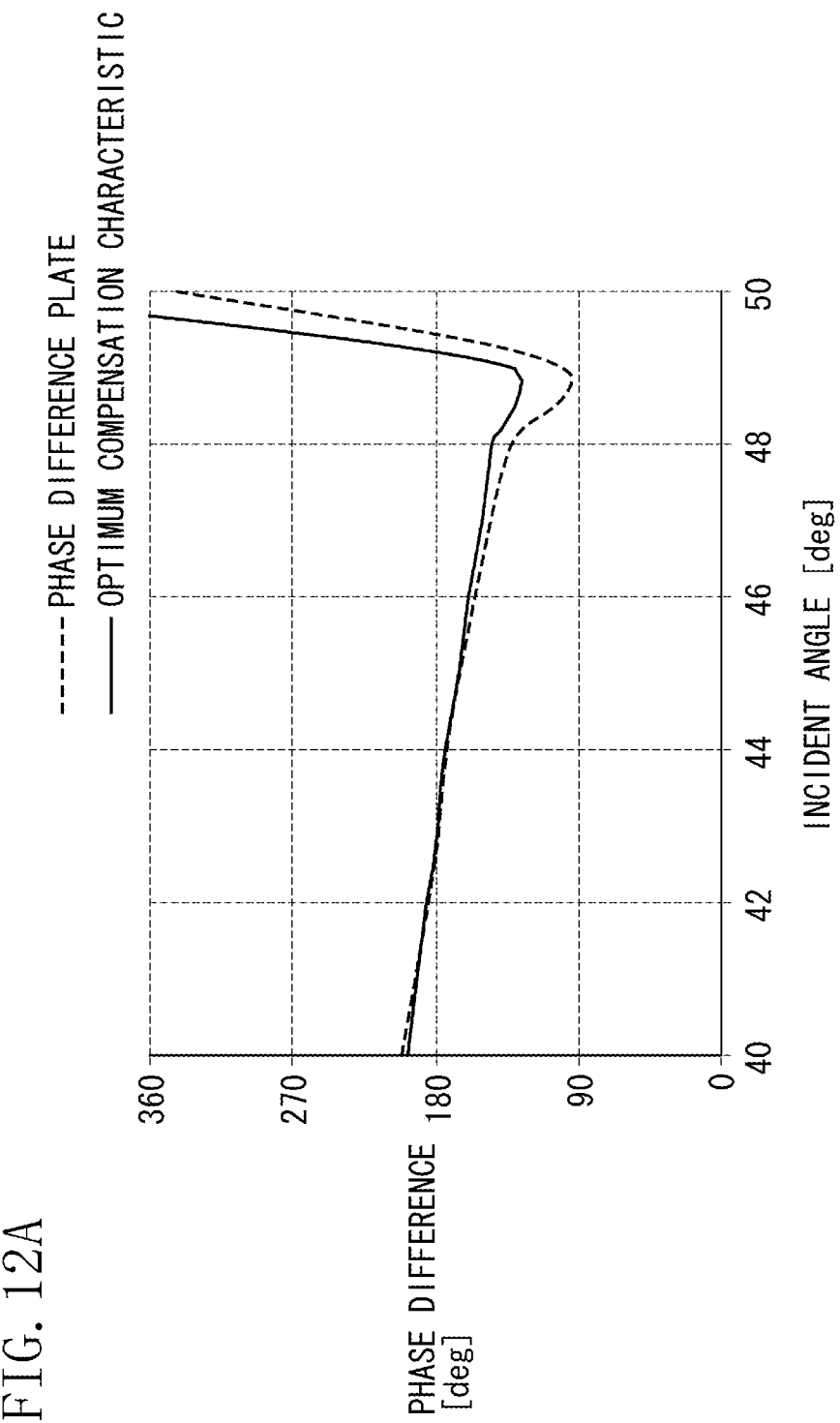
FIGS. 12A, 12B and 12C are diagrams illustrating incident angle characteristics with respect to the phase difference of each phase difference plate according to a third exemplary embodiment of the present invention.
Figure 12B:
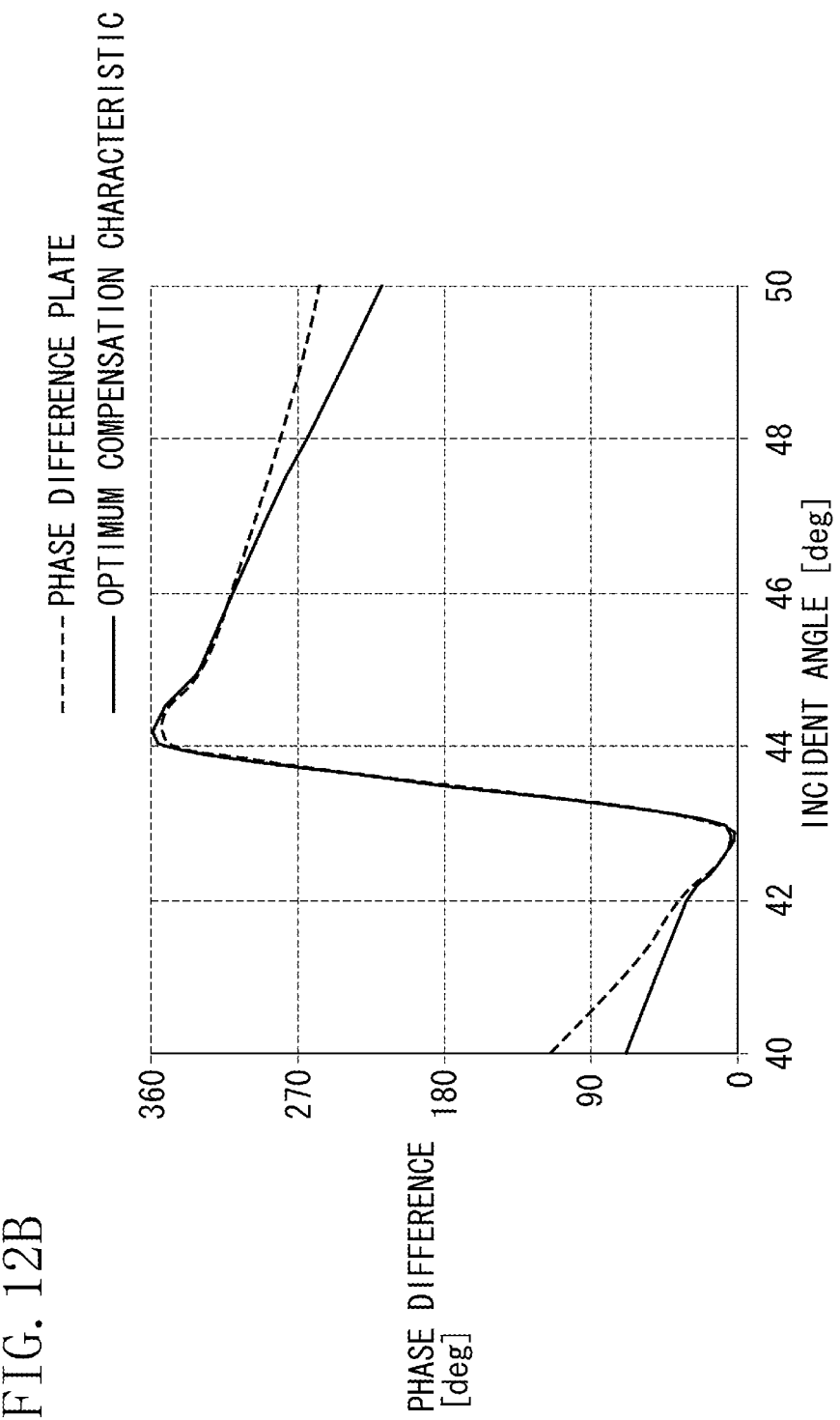
Figure 12C:
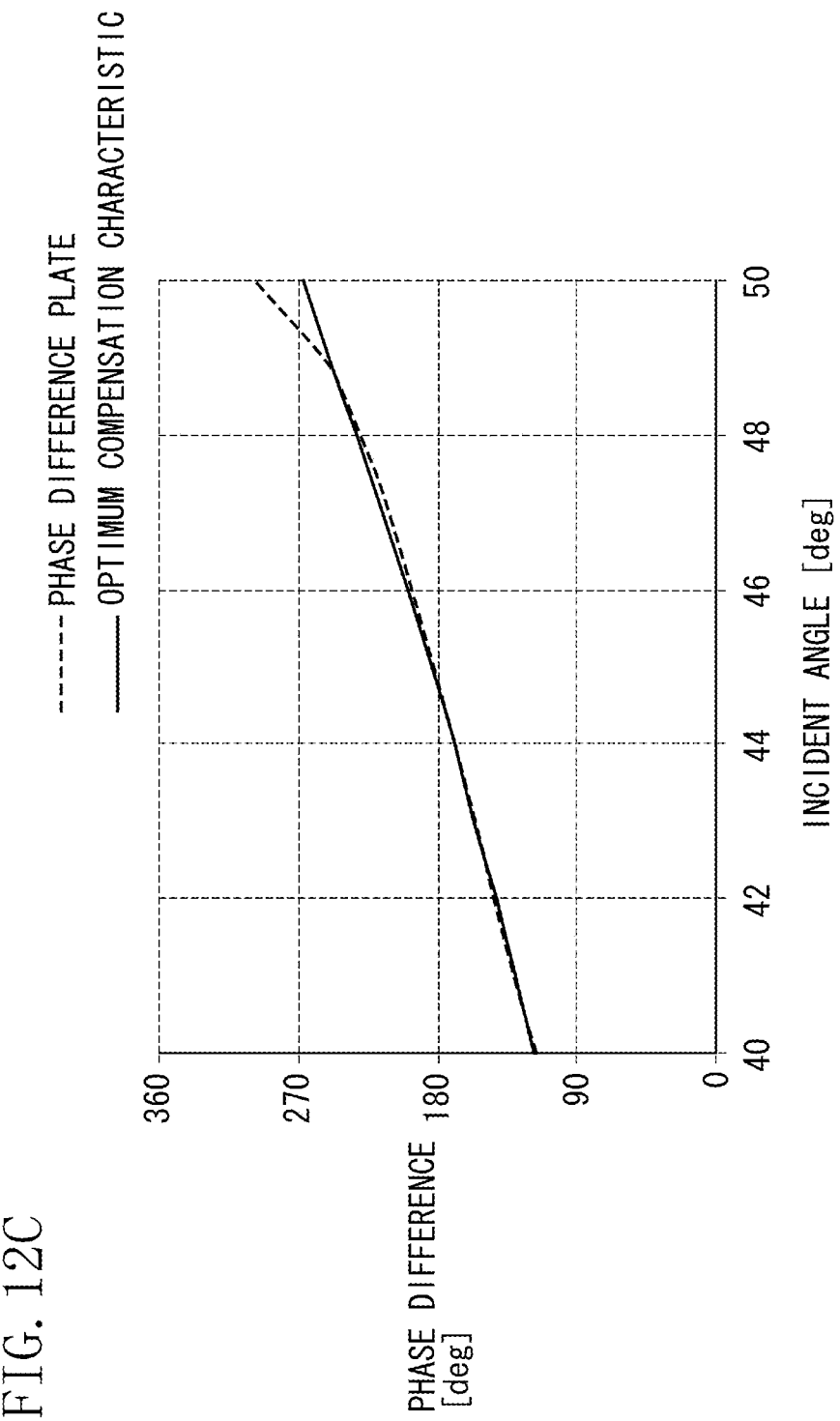

Like in FIG. 8, in the configuration illustrated in FIG. 10, a phase difference [deg] with respect to an incident angle [deg] is illustrated in FIGS. 12A, 12B and 12C. FIGS. 12A, 12B and 12C correspond to a red light path, a green light path, and a blue light path respectively. A solid line represents the compensation characteristics optimal for correcting the phase difference occurring in the dichroic film. A dashed line represents the phase compensation characteristics of two phase difference plates disposed on the respective light paths with respect to an incident angle. A solid line and a dashed line both represent the sum of phase differences of two phase difference plates.

Figure 13:
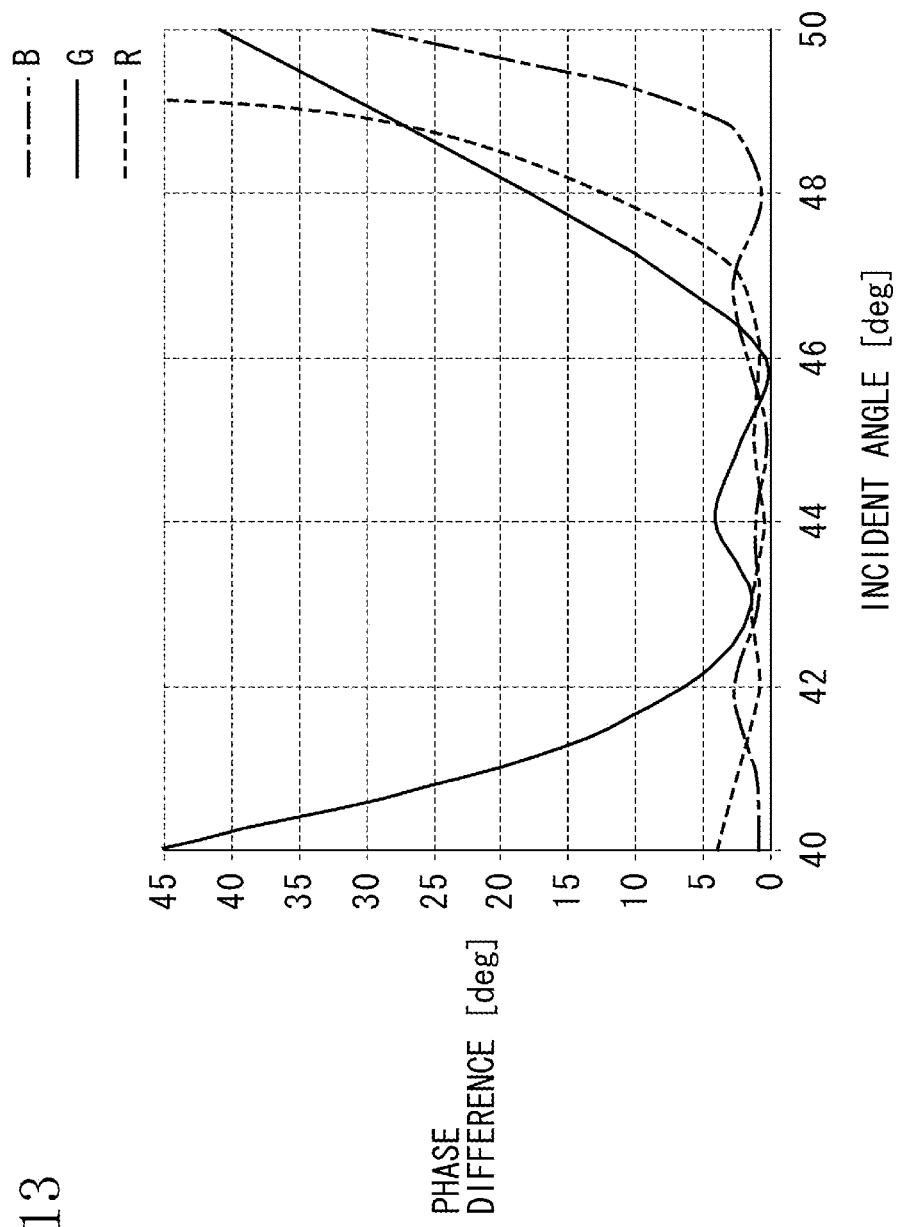
FIG. 13 is a diagram illustrating incident angle characteristics with respect to the phase difference for each color light after phase compensation according to a third exemplary embodiment of the present invention.

In FIG. 13, the difference between two phase difference plates represented by a solid line and a dashed line in FIG. 12 is illustrated with respect to the respective color lights. As compared to the case of FIG. 9, it can be seen that the phase difference in the red (dashed line) and blue (dashed-dotted line) wavelength bands is suppressed to be smaller.

In the third exemplary embodiment, two phase difference plates are used to compensate for the phase difference occurring in the dichroic film. In addition to these two phase difference plates, a phase difference plate with characteristics other than the above characteristics may be further provided to compensate for the phase difference occurring in the liquid crystal molecules of the image display element. Accordingly, the contrast can be further increased.

Figure 14:
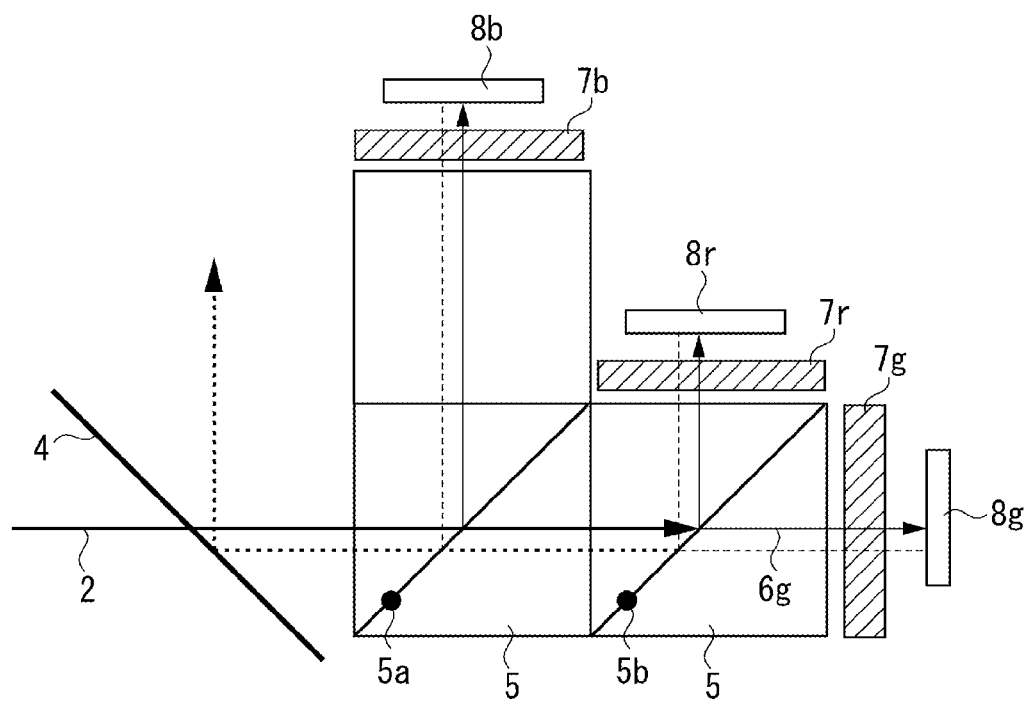
FIG. 14 is a schematic configuration diagram of a projection-type image display apparatus according to a fourth exemplary embodiment of the present invention.

A fourth exemplary embodiment will be described. Another exemplary embodiment of the present invention is illustrated in FIG. 14. In FIG. 14, the difference from the configuration of FIG. 1 is that the color separation element does not include the cross dichroic prism but includes a plurality of dichroic prisms. By the configuration of FIG. 14, the same effect as in the first exemplary embodiment can be achieved. Also, another effect of the exemplary embodiment illustrated in FIG. 14 is that the phase compensation can be achieved more easily because the surface normal directions of the dichroic films are unified.

Figure 15:
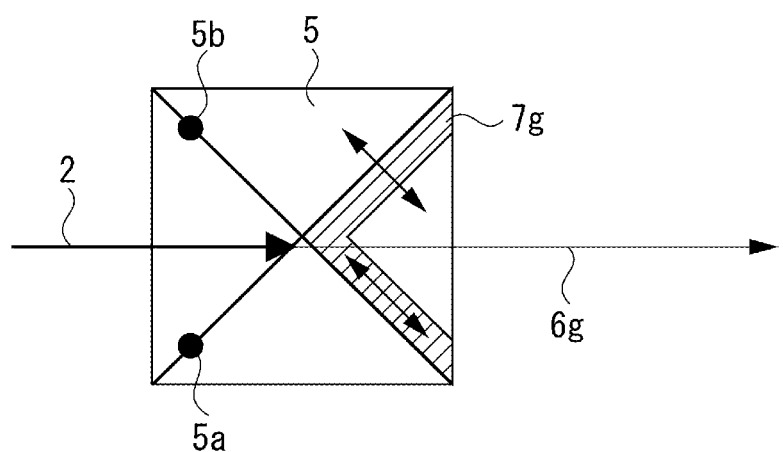
FIG. 15 is a schematic configuration diagram of a projection-type image display apparatus according to a fifth exemplary embodiment of the present invention.

A fifth exemplary embodiment will be described. Another exemplary embodiment of the present invention is illustrated in FIG. 15. The difference from the configuration of FIG. 1 is that the phase difference plate 7g is disposed between column type prisms that constitute the dichroic film and the cross dichroic prism. By the configuration of FIG. 15, the same effect as in the first exemplary embodiment can be achieved. Also, another effect of the exemplary embodiment illustrated in FIG. 15 is that a higher contrast can be achieved because phase difference plates optimized for respective dichroic films 5a and 5b can be disposed. Also, the same effect can be achieved even when the phase difference plates disposed on the blue and red light paths are configured as illustrated in FIG. 15.

In addition, in each exemplary embodiment, the direction c of the optic axis of the phase difference plate need not be set to be exactly parallel or perpendicular to the surface normal m of the dichroic film. That the direction c of the optic axis of the phase difference plate is parallel or perpendicular to the surface normal m of the dichroic film represents that the angle θ formed by the direction c of the optic axis and the surface normal m of the dichroic film includes a range satisfying the following expression 1A or 1B.

$$0 \leq \theta \leq 10 \text{ [deg]} \quad \text{(Expression 1A) or}$$

$$80 \leq \theta \leq 90 \text{ [deg]} \quad \text{(Expression 1B)}$$

The angle θ has two ranges of expression 1A and 1B because there are a case where the direction c of the optic axis and the surface normal m are parallel and a case where the direction c of the optic axis and the surface normal m are perpendicular. The angle θ is out of the range of expression 1A and 1B, the effect of compensating for the phase difference generated in the dichroic film is lowered. Therefore, the angle θ can satisfy expression 1A or 1B.

It is more advantageous that the angle θ satisfies the following expressions.

$$0 \leq \theta \leq 5 [deg]$$ (Expression 2A) or $$85 \leq \theta \leq 90 [deg]$$ (Expression 2B)

Also, the direction c of the optic axis of the phase difference plate need not be set to be exactly included within the plane including both of the surface normal m of the dichroic film and the surface normal n of the prism incident/exit plane. It is advantageous that the direction c forms an angle of 5 degrees or less with the plane including both of the surface normal m of the dichroic film and the surface normal n of the prism incident/exit plane.

Also, even in a case where the above described phase difference plate is set as a first phase difference plate and a second phase difference plate is additionally inserted between the dichroic film and the image display device, the direction c of the optic axis of the second phase difference plate need not be set to be exactly parallel or perpendicular to the surface normal m of the dichroic film.

Also, various materials may be used for the phase difference plate. For example, the phase difference plate may be formed by liquid crystal molecules oriented in a desired direction, or a phase difference film formed by stretching a polymer film. Also, the phase difference plate may be a crystal material cut at a desired axis angle using the refractive-index anisotropy of the crystal material, or a phase difference plate using a structural birefringence based on a sub-wavelength periodic microstructure. The phase difference plate is not limited to materials and manufacturing methods.

Also, the phase difference given by the phase difference plate may advantageously be provided to compensate the phase difference generated in the dichroic film. When the film thickness of the dichroic film or the total number of layers increases, the phase difference given to the incident light also increases. Therefore, the phase difference of the phase difference plate may be set to be large.

Also, the effect of the exemplary embodiment of the present invention can be obtained by arranging the phase difference plate on any one of light paths of color lights among paths of red, green and blue wavelength bands. The phase difference plate may more advantageously be arranged on all light paths of the color lights. In this way, the leaking light can be reduced and high contrast can be obtained.

Also, the image display element is not limited to a reflection-type image display element, and may be a transmission-type image display element. For example, a projection-type image display device in which a dichroic mirror is arranged between a polarizing beam splitter and a transmission-type image display element, the phase difference plate may be arranged between the dichroic mirror and the transmission-type image display element. The direction of the optic axis of the phase difference plate may be perpendicular or parallel to the surface normal m within the plane including the surface normal m of the color separation plane of the dichroic mirror and the normal of the transmission-type image display element. Accordingly, a projection-type image display apparatus with a high contrast can be provided.

Also, even if the type of the light source is changed, the reduction effect of the leaking light can be obtained when the phase difference plate having the optic axis in a direction parallel or perpendicular to the surface normal m of the dichroic film is arranged between the dichroic prism and the image display element. For example, although red, green, and blue wavelength bandwidths are different according to the type of the light source, any light source may be used. A light source including light of red, green and blue wavelength bands may be used. Three-color (red, green, blue) solid light emission sources may be combined and light paths may be combined using a color combining element such as a dichroic mirror or the like. A light source, of which the full width at half maximum of the wavelength distribution is 30 nm or less, may more advantageously be used in the wavelength band of each color. As these light sources, there is a solid light emission source such as a laser or an LED. Since there is a chromatic dispersion (deviation of the phase difference dependent on the wavelength), the deviation from the optimal value increases as the wavelength band is wider. Accordingly, as the wavelength band used is narrower, the deviation from the optimal value is reduced. Therefore, the phase difference can be compensated with higher accuracy. Also, by using the light source having a narrower bandwidth, the design or fabrication of the dichroic film can be facilitated. Also, upon the color separation, the occurrence of the reflection of the light other than the used wavelength band is suppressed, and it is less likely to generate ghost light.

Also, in each exemplary embodiment, the wire grid polarizer is used as the type of the polarizing beam splitter 4 that finally guides image light reflected by the image display element toward the projection optical system and returns unnecessary light toward the light source, but the polarizing beam splitter 4 is not limited thereto. For example, the polarizing beam splitter may be a type in which a thin film is laminated on a surface which faces a prism, or a type in which a layer having an anisotropic refractive index is laminated. When the polarizing beam splitter using a periodic structure, which is represented by a wire grid, is used, an extinction ratio or an angle characteristic is more desirable because the leaking light is suppressed as compared to the polarizing beam splitter with the thin film laminated thereon.

Also, when an incident angle of light flux incident on the same point of the dichroic film among light fluxes incident on the image display element is excessively large, it is difficult to perform compensation over the entire incident angle range. Therefore, in order to obtain a constant phase compensation effect, the incidence angle of the light flux may advantageously be 20 degrees or less.

TABLE 1

| Number of Layers | Material | Thickness [nm] |
|---|---|---|
| 55 | Ta2O5 | 17.23 |
| 54 | AL2O3 | 92.98 |
| 53 | Ta2O5 | 31.93 |
| 52 | AL2O3 | 85.87 |
| 51 | Ta2O5 | 156.98 |
| 50 | AL2O3 | 99.52 |
| 49 | Ta2O5 | 151.25 |
| 48 | AL2O3 | 91.78 |
| 47 | Ta2O5 | 159.3 |
| 46 | AL2O3 | 84.85 |
| 45 | Ta2O5 | 156.44 |
| 44 | AL2O3 | 89.95 |
| 43 | Ta2O5 | 148.12 |
| 42 | AL2O3 | 79.75 |
| 41 | Ta2O5 | 139.33 |
| 40 | AL2O3 | 83.02 |
| 39 | Ta2O5 | 145.56 |
| 38 | AL2O3 | 103.64 |
| 37 | Ta2O5 | 150.65 |
| 36 | AL2O3 | 92.38 |
| 35 | Ta2O5 | 161.92 |
| 34 | AL2O3 | 92.08 |
| 33 | Ta2O5 | 161.23 |
| 32 | AL2O3 | 88.96 |
| 31 | Ta2O5 | 63.65 |

TABLE 1-continued

| Number of Layers | Material | Thickness [nm] |
|---|---|---|
| 30 | AL2O3 | 29.15 |
| 29 | Ta2O5 | 64.98 |
| 28 | AL2O3 | 102.6 |
| 27 | Ta2O5 | 61.46 |
| 26 | AL2O3 | 31.46 |
| 25 | Ta2O5 | 63.08 |
| 24 | AL2O3 | 90.86 |
| 23 | Ta2O5 | 162.97 |
| 22 | AL2O3 | 89.72 |
| 21 | Ta2O5 | 160.52 |
| 20 | AL2O3 | 98.77 |
| 19 | Ta2O5 | 152.99 |
| 18 | AL2O3 | 113.25 |
| 17 | Ta2O5 | 142.07 |
| 16 | AL2O3 | 142.64 |
| 15 | Ta2O5 | 144.07 |
| 14 | AL2O3 | 122.06 |
| 13 | Ta2O5 | 148.18 |
| 12 | AL2O3 | 104.02 |
| 11 | Ta2O5 | 149.4 |
| 10 | AL2O3 | 117.54 |
| 9 | Ta2O5 | 149.55 |
| 8 | AL2O3 | 106.49 |
| 7 | Ta2O5 | 144.51 |
| 6 | AL2O3 | 118.4 |
| 5 | Ta2O5 | 151.93 |
| 4 | AL2O3 | 93.85 |
| 3 | Ta2O5 | 31.94 |
| 2 | AL2O3 | 87.79 |
| 1 | Ta2O5 | 19.51 |

*Upper/lower substrates: n = 1.52

TABLE 2

| Number of Layers | Material | Thickness [nm] |
|---|---|---|
| 49 | AL2O3 | 91.85 |
| 48 | Ta2O5 | 96.51 |
| 47 | AL2O3 | 159.12 |
| 46 | Ta2O5 | 199.95 |
| 45 | AL2O3 | 137.16 |
| 44 | Ta2O5 | 94.81 |
| 43 | AL2O3 | 101.2 |
| 42 | Ta2O5 | 89.68 |
| 41 | AL2O3 | 147.18 |
| 40 | Ta2O5 | 185.08 |
| 39 | AL2O3 | 149.59 |
| 38 | Ta2O5 | 84.42 |
| 37 | AL2O3 | 114.12 |
| 36 | Ta2O5 | 90.11 |
| 35 | AL2O3 | 134.66 |
| 34 | Ta2O5 | 193.24 |
| 33 | AL2O3 | 140.96 |
| 32 | Ta2O5 | 85.67 |
| 31 | AL2O3 | 119.72 |
| 30 | Ta2O5 | 86.58 |
| 29 | AL2O3 | 139.71 |
| 28 | Ta2O5 | 194.2 |
| 27 | AL2O3 | 137.34 |
| 26 | Ta2O5 | 89.86 |
| 25 | AL2O3 | 113.91 |
| 24 | Ta2O5 | 87.62 |
| 23 | AL2O3 | 144.12 |
| 22 | Ta2O5 | 192.62 |
| 21 | AL2O3 | 140.98 |
| 20 | Ta2O5 | 91.89 |
| 19 | AL2O3 | 104.72 |
| 18 | Ta2O5 | 91.81 |
| 17 | AL2O3 | 143.65 |
| 16 | Ta2O5 | 190.51 |
| 15 | AL2O3 | 161.94 |
| 14 | Ta2O5 | 74.51 |
| 13 | AL2O3 | 165.64 |
| 12 | Ta2O5 | 84.36 |
| 11 | AL2O3 | 195.25 |

TABLE 2-continued

| Number of Layers | Material | Thickness [nm] |
|---|---|---|
| 10 | Ta2O5 | 220 |
| 9 | AL2O3 | 160.06 |
| 8 | Ta2O5 | 88.82 |
| 7 | AL2O3 | 150.13 |
| 6 | Ta2O5 | 113.7 |
| 5 | AL2O3 | 220 |
| 4 | Ta2O5 | 215.85 |
| 3 | AL2O3 | 166.77 |
| 2 | Ta2O5 | 97.01 |
| 1 | AL2O3 | 92.35 |

*Upper/lower substrates: n = 1.52

TABLE 3

|  | Material | Thickness [μm] | Axis angle [deg] |
|---|---|---|---|
| Phase difference plate 7r | Crystal | 58.9 | 0 |
| Phase difference plate 7g | Crystal | 97 | 0 |
| Phase difference plate 7b | Crystal | 90 | 90 |

TABLE 4A

| (a) | Material | Thickness [μm] | Axis angle [deg] |
|---|---|---|---|
| Phase difference plate 13r | Sapphire | 20 | 0 |
| Phase difference plate 7r | Crystal | 72.9 | 0 |

TABLE 4B

| (b) | Material | Thickness [μm] | Axis angle [deg] |
|---|---|---|---|
| Phase difference plate 13g | Sapphire | 51.9 | 90 |
| Phase difference plate 7g | Crystal | 118.5 | 0 |

TABLE 4C

| (c) | Material | Thickness [μm] | Axis angle [deg] |
|---|---|---|---|
| Phase difference plate 13b | Sapphire | 23.8 | 90 |
| Phase difference plate 7b | Crystal | 108.9 | 90 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-199436 filed Sep. 13, 2011, which is hereby incorporated by reference herein in its entirety.

What is claimed is:

1. A projection-type image display apparatus comprising:
a color separation element including a color separation surface configured to separate an incident light into a plurality of lights with wavelength bands different from each other;
a light modulation element configured to receive the light separated by the color separation element;
a polarizing beam splitter disposed between the color separation element and a projection optical system to guide an illumination light output from a light source to the color separation element and guide a combined image light exited from the color separation element to the projection optical system according to a polarization direction; and
a phase difference plate disposed between the color separation element and the light modulation element,
wherein, an optic axis of the phase difference plate and a normal of the color separation surface are substantially parallel or perpendicular to each other, in a cross section parallel to the normal of the color separation surface and a normal of the light modulation element.

2. The projection-type image display apparatus according to claim 1, wherein the phase difference plate is a first phase difference plate, further comprising a second phase difference plate between the first phase difference plate and the light modulation element,
wherein a second optic axis of the second phase difference plate and the normal of the color separation surface are substantially parallel or perpendicular to each other, in the cross section parallel to the normal of the color separation surface and the normal of the light modulation element.

3. The projection-type image display apparatus according to claim 1, wherein, when a refractive-index anisotropy of the color separation surface is approximated using a uniaxial refractive-index ellipsoidal body,
a direction of an optic axis of the color separation surface and a direction of the optic axis of the phase difference plate are set to be substantially perpendicular to each other,
if a first magnitude relationship between an ordinary-light refractive index n0 of the phase difference plate and an extraordinary-light refractive index ne as an optical axis of the phase difference plate is identical to a second magnitude relationship between an ordinary-light refractive index n0 and an extraordinary-light refractive index ne of the color separation surface, and
the direction of the optic axis of the color separation surface and the direction of the optic axis of the phase difference plate are set to be substantially parallel to each other,
if the first magnitude relationship is different from the second magnitude relationship.

4. The projection-type image display apparatus according to claim 1, further comprising a plurality of light sources,
wherein a full width at half maximum of a wavelength distribution of a light emitted from the light sources is equal to or less than 30 nm.

5. The projection-type image display apparatus according to claim 1, wherein an incident angle of the light flux, among light fluxes entering the light modulation element, entering the same point of the color separation element is equal to or less than 20 degrees.

6. The projection-type image display apparatus according to claim 1, further comprising:
the projection optical system configured to project an image light exiting from the light modulation element to a projection surface.

7. A projection-type image display apparatus comprising:
a light modulation element that modulates incident light within a first wavelength band and light exits from the light modulation element along a first path;
a phase difference plate is positioned to receive light along the first path, wherein
an optic axis of the phase difference plate is not parallel or perpendicular to the first path at a point at which the first path intersects the phase difference plate;
a color separation surface is positioned to receive light along the first path, wherein
the first wavelength band of the incident light enters the color separation surface along the first path;
a second wavelength band of the incident light enters the color separation surface along a second path, different from the first path;
the first wavelength band of the incident light and the second wavelength band of the incident light exit the color separation surface along a third path;
a normal of the color separation surface is not parallel or perpendicular to the first path, the second path, and the third path at a point at which the first path, the second path, and third path intersect the color separation surface; and
the normal of the color separation surface and the optic axis of the phase difference plate are substantially parallel or perpendicular to each other, in a cross section parallel to the normal of the color separation surface and the normal of the light modulation element; and
a plurality of optical elements for projecting light exiting along the third path.

8. The projection-type image display apparatus according to claim 7,
wherein a normal of the phase difference plate is substantially parallel to the first path at the point that the first path intersects the phase difference plate.

9. The projection-type image display apparatus according to claim 7,
wherein a normal of the phase difference plate is substantially parallel or perpendicular to the normal of the color separation surface.

10. The projection-type image display apparatus according to claim 7,
wherein a refractive-index anisotropy of the color separation surface is approximated using a uniaxial refractive-index ellipsoidal body;
an optic axis of the color separation surface and the optic axis of the phase difference plate are set to be substantially perpendicular to each other; and
a first magnitude relationship between an ordinary-light refractive index n0 of the phase difference plate and an extraordinary-light refractive index ne of the phase difference plate is substantially similar to a second magnitude relationship between an ordinary-light refractive index n0 color separation surface and an extraordinary-light refractive index ne of the color separation surface.

11. The projection-type image display apparatus according to claim 7,
- wherein a refractive-index anisotropy of the color separation surface is approximated using a uniaxial refractive-index ellipsoidal body;
- an optic axis of the color separation surface and the optic axis of the phase difference plate are set to be substantially parallel to each other; and
- a first magnitude relationship between an ordinary-light refractive index n0 of the phase difference plate and an extraordinary-light refractive index ne of the phase difference plate is substantially different from a second magnitude relationship between an ordinary-light refractive index n0 color separation surface and an extraordinary-light refractive index ne of the color separation surface.

12. The projection-type image display apparatus according to claim 7, further comprising: a polarizing beam splitter disposed along the third path that guides the incident light to the light modulation element and guides the light from the light modulation element to be projected.

* * * * *